(12) United States Patent
Ronca

(10) Patent No.: US 9,686,244 B2
(45) Date of Patent: **\*Jun. 20, 2017**

(54) RULE-BASED VALIDITY OF CRYPTOGRAPHIC KEY MATERIAL

(71) Applicant: Venafi, Inc., Salt Lake City, UT (US)

(72) Inventor: Remo Ronca, Salt Lake City, UT (US)

(73) Assignee: Venafi, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,762

(22) Filed: Apr. 17, 2014

(65) Prior Publication Data

US 2015/0271144 A1   Sep. 24, 2015

Related U.S. Application Data

(63) Continuation-in-part of application No. 14/222,046, filed on Mar. 21, 2014.

(51) Int. Cl.
*H04L 29/06* (2006.01)
*H04L 9/08* (2006.01)
*H04W 12/04* (2009.01)

(52) U.S. Cl.
CPC ........ *H04L 63/0428* (2013.01); *H04L 9/0819* (2013.01); *H04L 63/0876* (2013.01); *H04W 12/04* (2013.01); *H04L 2209/24* (2013.01)

(58) Field of Classification Search
CPC .................................................. H04L 63/0492
See application file for complete search history.

(56) References Cited

U.S. PATENT DOCUMENTS

| | | | |
|---|---|---|---|
| 5,659,617 A | 8/1997 | Fischer | |
| 6,044,462 A | 3/2000 | Zubeldia et al. | |
| 6,108,788 A | 8/2000 | Moses et al. | |
| 7,120,254 B2 * | 10/2006 | Glick | G06F 21/10 |
| | | | 380/251 |
| 7,275,102 B2 | 9/2007 | Yeager et al. | |
| 7,848,765 B2 | 12/2010 | Phillips et al. | |

(Continued)

OTHER PUBLICATIONS

"U.S. Appl. No. 14/221,919, Response filed Apr. 5, 2016 to Non Final Office Action mailed Jan. 5, 2016", 18 pgs.

(Continued)

*Primary Examiner* — Shawnchoy Rahman
(74) *Attorney, Agent, or Firm* — Schwegman Lundberg & Woessner, P.A.

(57) ABSTRACT

In representative embodiments, a rule-based certificate cryptographic key material comprising containing a rule set defining validity conditions is associated with cryptographic key material assigned to an entity for use in authenticated communications. The validity of the cryptographic material changes state based on whether the entity is compliant or non-compliant with the rule set. This is accomplished in a representative embodiment by suspending the validity of the cryptographic key material when the entity is non-compliant with the rules and reinstating the validity of the cryptographic key material when the entity becomes compliant. A rules compliance service determines the validity of the cryptographic material in part using updates sent by the entity. Entities can delegate the update to a delegate device. Encryption can be used to preserve privacy.

20 Claims, 14 Drawing Sheets

(56) References Cited

U.S. PATENT DOCUMENTS

| | | | |
|---|---|---|---|
| 7,961,884 B2 | 6/2011 | Edgett et al. | |
| 8,276,209 B2* | 9/2012 | Knibbeler | H04L 63/0492 380/258 |
| 8,327,417 B2* | 12/2012 | Carter | G06F 21/33 713/182 |
| 8,560,839 B2 | 10/2013 | Barham et al. | |
| 8,621,222 B1 | 12/2013 | Das | |
| 9,531,533 B2 | 12/2016 | Ronca | |
| 2002/0106085 A1 | 8/2002 | Jain et al. | |
| 2002/0136407 A1 | 9/2002 | Denning et al. | |
| 2004/0203908 A1 | 10/2004 | Hind et al. | |
| 2006/0059096 A1 | 3/2006 | Dublish et al. | |
| 2007/0074036 A1 | 3/2007 | Ramzan et al. | |
| 2009/0187983 A1 | 7/2009 | Zerfos et al. | |
| 2009/0235071 A1 | 9/2009 | Bellur et al. | |
| 2010/0148947 A1 | 6/2010 | Morgan et al. | |
| 2010/0211787 A1* | 8/2010 | Bukshpun | H04L 9/0838 713/170 |
| 2011/0162048 A1 | 6/2011 | Bilbrey et al. | |
| 2012/0159156 A1 | 6/2012 | Barham et al. | |
| 2012/0280783 A1 | 11/2012 | Gerhardt et al. | |
| 2012/0328101 A1 | 12/2012 | Lakshminarayanan | |
| 2013/0091452 A1 | 4/2013 | Sorden et al. | |
| 2013/0191640 A1 | 7/2013 | Bloomer | |
| 2013/0267253 A1 | 10/2013 | Case et al. | |
| 2013/0347058 A1 | 12/2013 | Smith et al. | |
| 2014/0052981 A1 | 2/2014 | King | |
| 2014/0380047 A1* | 12/2014 | Denning | H04L 9/0822 713/168 |
| 2015/0057838 A1 | 2/2015 | Scholl et al. | |
| 2015/0101012 A1* | 4/2015 | White | G06F 17/30424 726/1 |
| 2015/0271154 A1 | 9/2015 | Ronca | |
| 2015/0271155 A1 | 9/2015 | Ronca | |
| 2015/0271156 A1 | 9/2015 | Ronca | |
| 2015/0271157 A1 | 9/2015 | Ronca | |
| 2015/0271158 A1 | 9/2015 | Ronca | |

OTHER PUBLICATIONS

"U.S. Appl. No. 14/221,981, Corrected Notice of Allowance mailed Mar. 25, 2016", 2 pgs.

"U.S. Appl. No. 14/221,981, Notice of Allowance mailed Feb. 29, 2016", 8 pgs.

"U.S. Appl. No. 14/255,745, Examiner Interview Summary mailed Apr. 13, 2016", 5 pgs.

"U.S. Appl. No. 14/255,745, Final Office Action mailed Mar. 17, 2016", 19 pgs.

"U.S. Appl. No. 14/255,745, Reponse filed Jan. 28, 2016 to Non Final Office Action mailed Sep. 30, 2015", 22 pgs.

"U.S. Appl. No. 14/221,919, Non Final Office Action mailed Jan. 5, 2016", 29 pgs.

"U.S. Appl. No. 14/221,919, Non Final Office Action mailed Jul. 17, 2015", 38 pgs.

"U.S. Appl. No. 14/221,919, Response filed Oct. 27, 2015 to Non Final Office Action mailed Jul. 17, 2015", 29 pgs.

"U.S. Appl. No. 14/221,981, Final Office Action mailed Oct. 22, 2015", 16 pgs.

"U.S. Appl. No. 14/221,981, Non Final Office Action mailed Jul. 8, 2015", 17 pgs.

"U.S. Appl. No. 14/221,981, Response filed Oct. 7, 2015 to Non Final Office Action mailed Jul. 8, 2015", 23 pgs.

"U.S. Appl. No. 14/222,046, Non Final Office Action mailed Jul. 27, 2015", 39 pgs.

"U.S. Appl. No. 14/222,046, Response filed Dec. 28, 2015 to Non Final Ofice Action mailed Jul. 27, 2015", 29 pgs.

"U.S. Appl. No. 14/255,710, Non Final Office Action mailed Sep. 25, 2015", 14 pgs.

"U.S. Appl. No. 14/255,710, Response filed Jan. 25, 2016 to Non Final Office Action mailed Sep. 25, 2015", 23 pgs.

"U.S. Appl. No. 14/255,745, Non Final Office Action mailed Sep. 30, 2015", 15 pgs.

"U.S. Appl. No. 14/221,981, Corrected Notice of Allowance mailed Aug. 2, 2016", 5 pgs.

"U.S. Appl. No. 14/221,981, Notice of Allowance mailed Aug. 24, 2016", 8 pgs.

"U.S. Appl. No. 14/255,710, Notice of Allowance mailed Aug. 17, 2016", 11 pgs.

"U.S. Appl. No. 14/255,745, Non Final Office Action mailed Jul. 27, 2016", 11 pgs.

"U.S. Appl. No. 14/255,745, Response filed Aug. 10, 2016 to Non Final Office Action mailed Jul. 27, 2016", 8 pgs.

Al-Fuqaha, et al., "Geo-encryption protocol for mobile networks", Computer Communications, (2007), 2510-2517.

"U.S. Appl. No. 14/221,919, Final Office Action mailed Jul. 18, 2016", 28 pgs.

"U.S. Appl. No. 14/221,981, Corrected Notice of Allowance mailed Jun. 8, 2016", 5 pgs.

"U.S. Appl. No. 14/222,046, Non Final Office Action mailed Apr. 25, 2016", 25 pgs.

"U.S. Appl. No. 14/255,710, Examiner Interview Summary mailed Jul. 7, 2016", 3 pgs.

"U.S. Appl. No. 14/255,710, Final Office Action mailed May 2, 2016", 15 pgs.

"U.S. Appl. No. 14/255,710, Response filed Jul. 5, 2016 to Final Office Action mailed May 2, 2016", 18 pgs.

"U.S. Appl. No. 14/255,745, Advisory Action mailed Jun. 2, 2016", 3 pgs.

"U.S. Appl. No. 14/255,745, Response filed May 17, 2016 to Final Office Action mailed Mar. 17, 2016", 16 pgs.

"U.S. Appl. No. 14/221,919, Response filed Sep. 19, 2016 to Final Office Action mailed Jul. 18, 2016", 11 pgs.

"U.S. Appl. No. 14/222,046, Response filed Oct. 25, 2016 to Non Final Office Action mailed Apr. 25, 2016", 25 pgs.

"U.S. Appl. No. 14/255,745, Notice of Allowance mailed Oct. 13, 2016", 10 pgs.

* cited by examiner

RULE-BASED VALIDITY OF CRYPTOGRAPHIC KEY MATERIAL

CLAIM OF PRIORITY

This application is a Continuation in Part and claims the benefit of priority to U.S. patent application Ser. No. 14/222,046, filed Mar. 21, 2014, which is incorporated by reference in its entirety.

FIELD

This application relates generally to managing trust relationships between computer systems and, in an example embodiment, a system that restricts the applicability of cryptographic key material in an authentication context by a rule set.

BACKGROUND

In an authentication context aimed at authenticating a client against a service using cryptographic key material, access is granted or denied based on cryptographic evidence that the authenticating client has control over a specific key part, only known to the client, in the case of an asymmetric cryptographic approach, or shared between the client and the service provider, in the case of a symmetric cryptographic approach. Various standards and technologies are employed to accomplish the authentication of a client to a service, server, or peer such as X.509 certificates and related public key infrastructure (PKI) used in Transport Layer Security (TLS) and its predecessor, Secure Sockets Layer (SSL), Secure Shell (SSH) and its related infrastructure, and other such technologies.

With the proliferation of sensitive and private information that is stored on and carried by computers, devices, networks and so forth, security and privacy have become increasingly important. Also, significant efforts have been devoted to minimizing attack surfaces in networks to enhance security.

DETAILED DESCRIPTION

Figure 1:
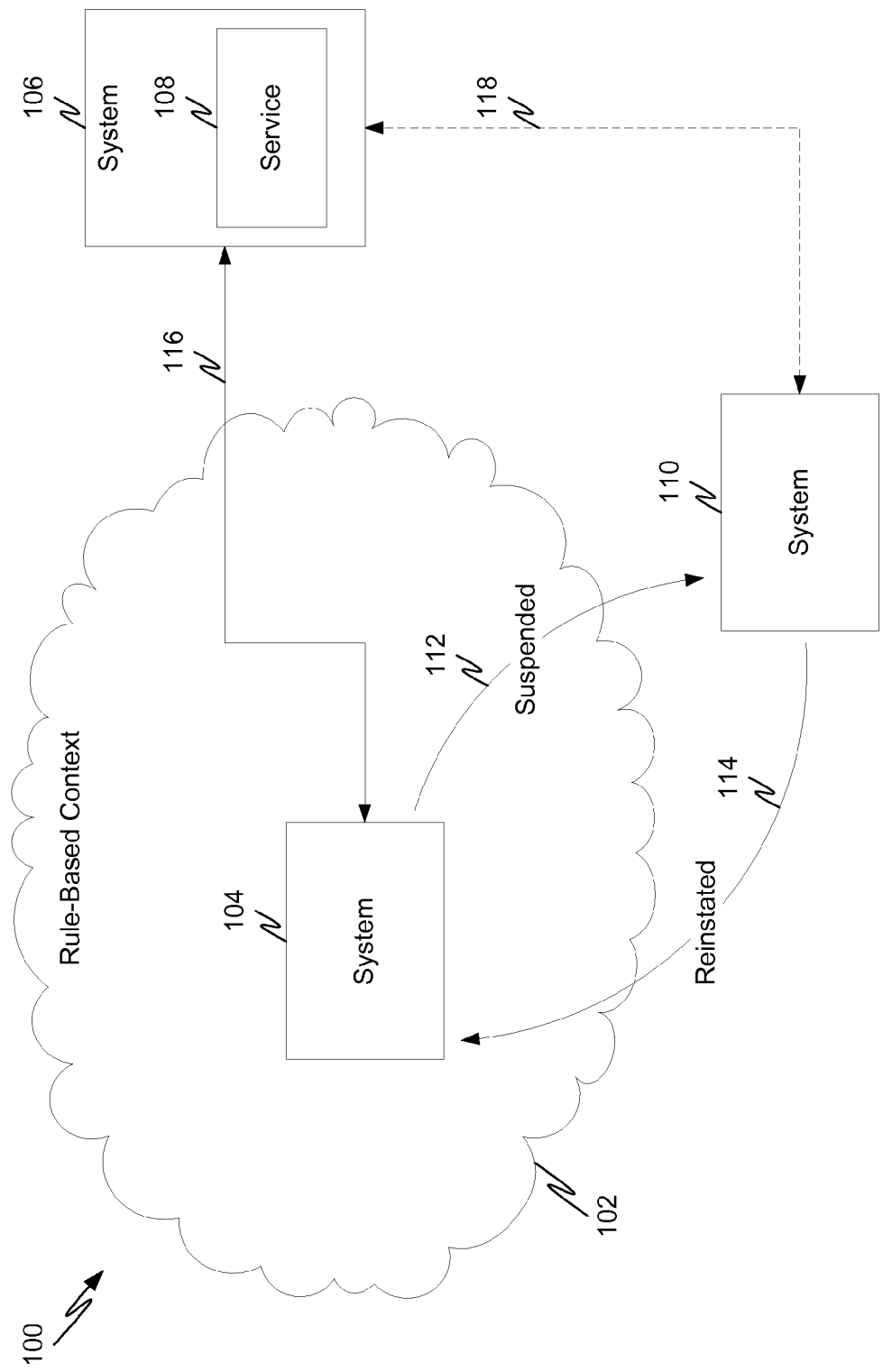
FIG. 1 illustrates a basic system where a system moves into and out of a defined geographic region.

In the following description, for purposes of explanation, numerous specific details are set forth to provide a thorough understanding of example embodiments. It will be evident to one skilled in the art, however, that the present subject matter may be practiced without these specific details.

Overview

This disclosure describes systems and methods that include additional evidence into the authentication infrastructure by associating rules with the cryptographic key material used for authentication.

In representative embodiments, a client's cryptographic key material is associated with a rule set that specify parameters such as a time schedule, a geo-fence or a quorum of other applicable cryptographic key material defining if the client's cryptographic key material is authorized for authentication. The client's rule set is tested for compliance to identify whether the client may establish authenticated communications using the cryptographic key material. Compliance to the rule set allows the client to establish authenticated communications using the cryptographic key material, while non-compliance results in a suspension of the key material's applicability. Some embodiments support the reverse situation (e.g., compliance to the rule set might result in suspending the cryptographic key material, whereas non-compliance re-instates the key material).

In some embodiments, the compliance evaluation is processed on the device attempting to establish an authenticated session. In other embodiments, a service performs the evaluation instead (or in addition to).

DEFINITIONS

In this disclosure, the following terms and definitions will be used.

Client means the system, user, device, account, and so forth that initiates a secure connection, such as when a secure connection request is sent. A system, device, virtual machine, groups thereof, and so forth may have multiple clients.

Server means the system, host, device, account, and so forth that receives a secure connection request (e.g., from a client). A system, device, virtual machine, groups thereof, and so forth may have multiple servers.

Client/Server means a system, device, virtual machine, groups thereof and so forth that function both as a client and a server (e.g., has at least one client and at least one server).

Entity is a term that encompasses at least system, device, virtual machine, client, server, user, account, and so forth that can utilize or are associated with cryptographic key material as part of authenticated communications.

Subscriber means an entity that requests or obtains cryptographic key material for authenticated communications.

Certificate means an electronic document that uses a digital signature to bind a public key with an identity. The certificate can be used to verify that a public key belongs to an individual, usually through cryptographic means and/or protocols.

Quorum means the minimum number of a pre-defined set of key instance(s) and/or identifier(s) of associated cryptographic key material (e.g., some way to indicate the related cryptographic key material) in a designated state.

Rule set means the set of rules that are applied to determine whether associated cryptographic key material should have a valid or invalid validity state (e.g., be honored for authenticated communications or not honored for authenticated communications). A rule set can include such things as one or more time schedules (e.g., times at which the cryptographic key material should be valid and/or invalid, the time at which an update message should be sent and/or received, and so forth), quorum information, geo-fence information, and/or other rules. In this context geo-fence information means information describing a virtual perimeter for a real-world geographic area. A geo-fence can be dynamically generated or can be a predefined boundary and/or set of boundaries. A geo-fence can be absolute, such as defining an absolute geographic area or it can be relative such as defining a geographic area relative to one or more reference locations (e.g., a geographic location and/or coordinate) and/or landmarks (e.g., within a building or on the corner of main and robin streets and so forth). Validity can be based on a system being inside or outside the geo-fence. For example, the cryptographic key material may be valid when a system is inside the geo-fence. In another example, the cryptographic key material may be valid when a system is outside the geo-fence. A rule can define conditions under which a system is in compliance (e.g., the system is in compliance if the system is not accessing the server between the hours of midnight and 5:00 am). Additionally, or alternatively, a rule can be specified separately from associated conditions (e.g., the rule is the time schedule from midnight to 5:00 am and the conditions are that the system is not in compliance when it tries to access the server during the time schedule). Either implementation is acceptable, as the distinction is largely, if not wholly, semantic. This disclosure does not attempt to distinguish between the two and often uses them interchangeably. A rule set can also have associated logic to combine the outcome of individual rules to reach a determination of what the proper validity state should be so that the validity state can be based on a combination of various conditions and/or logic (e.g., overall compliance exists when the system is in compliance with rules (A or B) and (C or D)).

Rule-based attribute set (RBAS) means a set of attributes that form the basis for determining the validity status of cryptographic key material associated with the RBAS. A RBAS may be stored in a data structure of some sort or can be stored as separate attributes or can exist as separate or groups of attributes stored in various locations and/or data structures. In other words, the RBAS need not be stored as a single collection of attributes to be considered a RBAS. The RBAS can include one or more of:

1. one or more rule sets, including such things as timing schedules or other timing information, quorum information, geo-fence information and so forth;
2. delegate identifier(s) and/or other delegate information for things like delegation of decryption of various items, delegation of rule evaluation, service where rule evaluation messages should be sent, delegation of verification/validation of various items, and so forth;
3. policy information;
4. key instance(s) and/or identifier(s) of associated cryptographic key material (e.g., some way to indicate the related cryptographic key material); and/or
5. other information.

Policy means a set of conditions and/or criteria that are to be complied with to be "in policy" or "meeting policy". For example, policy information can specify what type of key options and/or key properties should be used. As another example, policy information can identify conditions and/or requirements for delegation to identified delegates. Policy information can also specify other conditions and/or criteria.

Rule-based certificate (RBC) means a certificate having RBAS information associated or embedded therewith.

Rule-based Key Material (RBKM) is used herein to encompass both RBC and RBAS and its associated cryptographic key material.

Validity state, means the state of a RBC and/or cryptographic key material associated with RBAS either as valid or as not valid. In this disclosure terms like invalidate, suspend, revoke and so forth will be used to indicate a state where the RBC and/or cryptographic key material associated with RBAS is not valid and terms like reinstate, reissue and so forth will be used to indicate a state where the RBC and/or cryptographic key material associated with RBAS is valid. No distinction is intended other than to note that some implementations may suspend and then reinstate the same RBC and/or cryptographic key material while others may revoke the old RBC and/or cryptographic key material and reissue a new RBC and/or cryptographic key material. A valid state means that the cryptographic key material will be honored for authenticated communications and an invalid state means that the cryptographic key material will not be honored for authenticated communications.

Cryptographic key material, or more simply key material, means a key, key pair, key instance, and so forth that is used in authenticated communications.

Key pair (KP) means a public/private key combination where the private key may decrypt information encrypted by the public key or where a public key verifies signatures created by the private key.

Key set (KS) means all instances of a particular key pair. The key set may be a client key set or a server key set.

Key instance (KI) means a single instance of a particular key or key set. The key instance may be a client key instance, a server key instance or a key set instance. Key instance may be part of a key set, or a singular occurrence of a public or private key.

Key options mean one or more options provided by a particular implementation (e.g. SSH or other implementation) such as source control (e.g., allow and/or deny access from a particular source to a particular destination), forced commands, source restriction (e.g., allow and/or deny access based on source such as the address, name, distinguished name, or other identifier of a system or other location from which or to which connection may be made), location control (including geographic, business, current, and so forth), and other options that may apply to limit or grant use of the trust relationship (e.g. no X11 forwarding, no agent forwarding, no port forwarding, etc.) and so forth.

Key properties, also referred to as key characteristics, mean one or more characteristics of a key, key pair, key set, key instance, etc. such as key length, the algorithm used to generate the key and so forth. Key characteristics also includes properties about the key such as contact information of a person responsible for or related to the key, authorized storage location(s) for the key, and so forth.

Client Trust (CT) means a trust relationship where it is established that a client private key is linked to the authorized public key on a server. This is often evidenced by way of having the client public key stored in server side authorized key file.

Server Trust (ST) means a trust relationship where it is established that the server public key is known by the client. This is often evidenced by way of having the server public key stored in client side user known host key file and/or global known host key file.

Trust relationship means CT and/or ST. A trust relationship exists where CT and/or ST exist between a client and server.

DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

FIG. 1 illustrates a basic system 100 where a system 104 complies with or does not comply with a rule set. In describing FIG. 1, the term RBKM will be used with the understanding that different embodiments can use RBC and/or RBAS with associated cryptographic key material. In this illustration, the system 104 has a RBKM comprising a rule set defining a rule-based context 102 and cryptographic key material (e.g., in the form of a RBC and/or cryptographic key material associated with RBAS) for use in authenticated communications 116 with the system 106. The system 104 may be a client or a server, depending on the embodiment. As the system 104 does not comply with or does comply with the rule set defining the rule-based context 102, the status of the system's 104 associated RBKM is changed from suspended to reinstated, depending on the compliance status of the system 104. The rules based context 102 thus represents whether or not system 104 complies with or does not comply with a rule set associated with its cryptographic key material (e.g., the rule set of the RBKM of the system 104).

In the illustrated embodiment, when the system 104 is not compliant with the rule-based context 102, its RBKM is suspended as indicated by arrow 112. Thus, the system 110 represents the system 104 not complying with the rule-based context 102 having its RBKM suspended (e.g., an invalid RBKM). While the system 110 is not compliant with the rule-based context 102, any attempt to establish authenticated communications with the system 106 will result in the system 106 discovering that the RBKM status for the system 110 is invalid. Thus the system 110 will be unable to establish authenticated communications with the system 106. Unsuccessful authenticated communications between the system 110 (e.g., system 104 not complying with the rule-based context 102) and the system 106 is illustrated by arrow 118. The system 106 can include a service 108 that checks the validity of the system's 110 RBKM when authenticated communications are attempted by the system 110.

When the system 110 complies with the rule set 102, the RBKM is reinstated so that it is valid for authenticated communications. Reinstatement of the RBKM is illustrated by arrow 114 and successful authenticated communications between the system 104 and the system 106 is illustrated by arrow 116. System 106 again uses service 108 to check the validity status of the RBKM when authenticated communications are attempted by system 104. The system 104 represents the system 110 complying with the rule-based context 102 with a valid RBKM status.

While the embodiment of FIG. 1 discusses suspension and reinstatement of the RBKM, alternative embodiments can accomplish the same effect by revoking the existing RBKM and issuing a new, valid RBKM rather than suspending and then reinstating the same RBKM. In this disclosure terms like invalidate, suspend, revoke and so forth will be used to indicate a state where the RBKM is not valid and terms like reinstate, reissue, validate, and so forth will be used to indicate a state where the RBKM is valid. No distinction is intended other than to note that some implementations may suspend and then reinstate the same RBKM and while others may revoke the old RBKM and reissue a new RBKM.

RBKM have an associated RBAS, either as part of a RBC or in embodiments where certificates are not used, the cryptographic key material is associated with the RBAS. As defined above, the RBAS comprises a rule set, having one or more rules that are evaluated to determine the validity state of the RBKM. Examples of such rules include a time schedule, a quorum, a geo-fence, and/or other rules. The rules can also have associated logic that determines how the rules should be combined to determine the validity state of the RBKM. The rules can thus be combined in various ways to create a set of conditions that must be met (or not met) in order to have a valid RBC and/or valid cryptographic key material.

The following are simply representative examples to illustrate how a rule set can operate and should not be taken as limiting. In one embodiment, the rule set is constructed so that the cryptographic key material is valid when [the day is a normal working day and not a holiday and not outside of normal working hours] OR [when the day is not a normal working day or it is outside of normal working hours and the system is located at the user's home] OR [when the day is not a not a normal working day or it is outside of normal working hours and there are 3 of 5 authorized devices within close proximity to the system (e.g., a quorum of 3 of 5 authorized devices are close to the system)]. In another embodiment, the cryptographic key material is not valid when the system is either outside of the office or when the system is outside of a user's home. In still another embodiment, the cryptographic key material is valid when the cryptographic key material of 1 of 3 authorized users are also valid (e.g., a quorum of 1 other authorized user has valid key material). In still another example, the cryptographic key material is valid if a rules compliance service has received an update within the last 10 minutes and if the system is within one of a plurality of designed geo-fence areas. Numerous other examples and embodiments are possible using the representative rule set outlined above.

Various mechanisms exist in various embodiments to accomplish the suspension and reinstatement of RBKM as an entity switches its compliance status according to a rule-based context. Typically such embodiments have 1) a mechanism for an entity to obtain appropriate cryptographic key material and an associated rule set; 2) a mechanism for updating the compliance status of the system with the rule set of the entity; and 3) a repudiation service, validation service or other mechanism to ascertain the validity of the cryptographic key material based on the compliance status of the entity. The embodiments used to accomplish these mechanisms will be different depending on the protocols and infrastructure used for authentication. For example, X.509 certificates using a PKI for authentication may implement the mechanisms differently than embodiments built upon SSH for authentication. Furthermore, some implementations may rely on a custom or semi-custom collection of services, cryptographic key material, RBAS, systems and so forth to accomplish these functions.

Additionally, or alternatively, when RBKMs are issued, the validity state can be set to be either valid or invalid. In some embodiments, the validity state is set to valid after issue and remains valid until the compliance with the rule set, policies, and so forth indicate that its status should be set to invalid. In some embodiments, the validity state is set to invalid after issue and remains invalid until the compliance with the rule set, policies, and so forth indicate that its status should be set to valid. While both approaches are appropriate in different situations, setting the "default" state to invalid and only changing the state to valid after the system shows that it meets the criteria for a valid RBKM may provide a better default security state. The above "default" state discussion applies to all the embodiments described herein.

Figure 2:
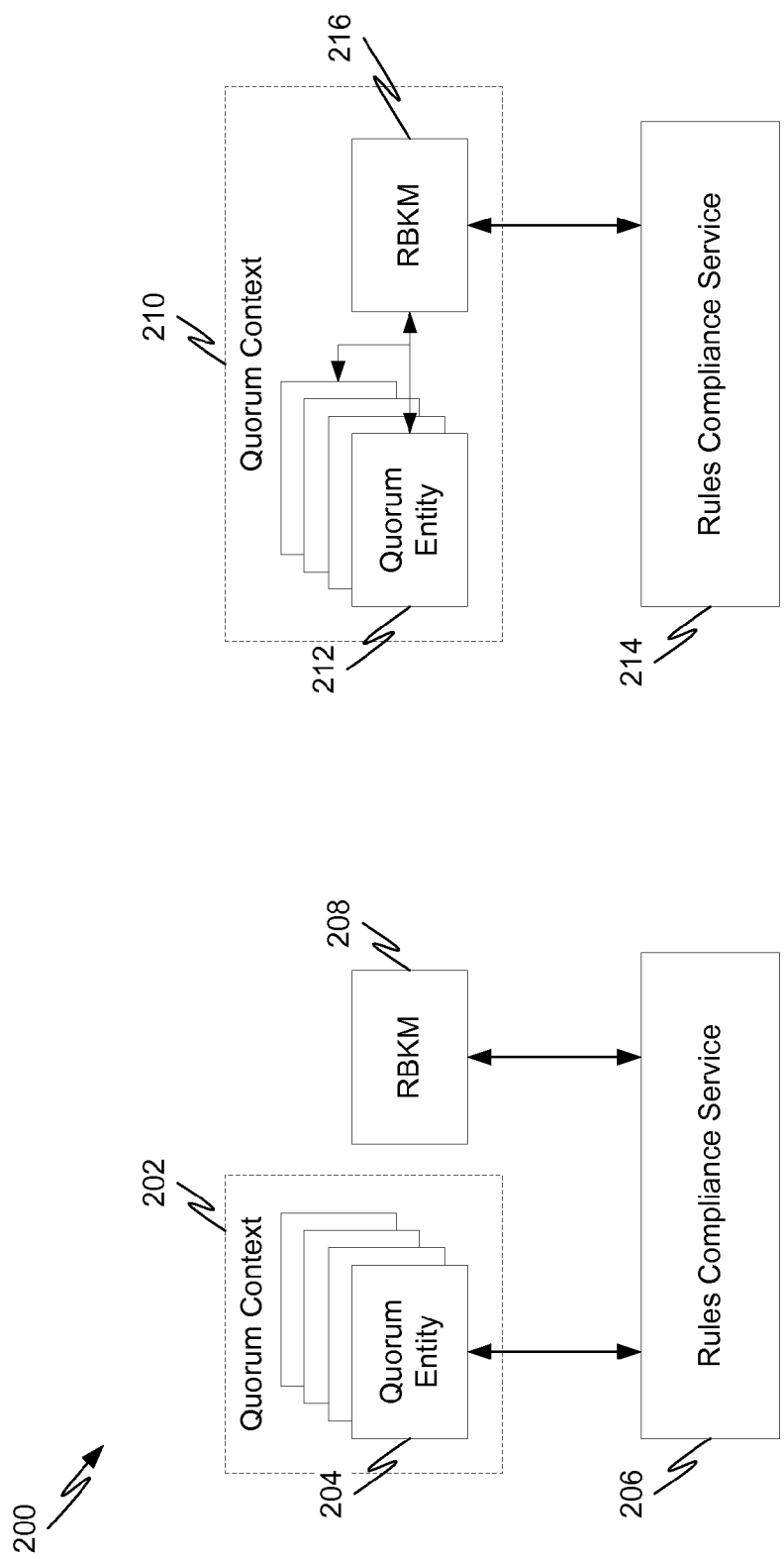
FIG. 2 illustrates representative embodiments of how quorums can be implemented.

FIG. 2 illustrates representative embodiments 200 of how quorums can be implemented. These representative examples are not meant to be exhaustive, but simply illustrative of how quorum information can be used in different rule sets. Quorums are generally evaluated based on a m of n type logic, where when at least m of n entities meet (or do not meet) a given criteria, certain things happen (or do not happen). The n entities are said to be part of a quorum context.

In one representative embodiment, a quorum rule in a rule set is measured with respect to a quorum context that does not include the system with the associated RBKM being evaluated. In this embodiment, a system 208 having associated RBKM that is to be evaluated for validity or invalidity by a rules compliance service 206. The rules compliance service 206 has access to the rule set of the RBKM associated with system 208 as well as the information needed to determine whether the validity status of the RBKM should be set to valid or invalid. The quorum context 202 includes n entities 204 which may or may not have their own individual RBKM. However, the quorum status of the members 204 of the quorum context 202 is available to the rules compliance service 206. In many embodiments, the quorum status of the members 204 will be based on the validity status of the member's individual RBKM. The rules evaluating service 206, can thus evaluate the quorum information of the rule set associated with the RBKM of system 208 relative to the quorum context 202. As an example, the RBKM of system 208 includes a requirement that the RBKM is only valid when 2 of the 4 quorum members 204 have RBKM that are valid. The status of the quorum members 204 RBKM is evaluated based on information received from the members of the quorum context 202, either directly from the individual members or as forwarded by one of the members and/or in some other way.

In another embodiment, the system with the associated RBKM being evaluated is part of the quorum context. Thus, in FIG. 2, system 216 is shown along with members 212 as part of the quorum context 210. In this type of embodiment, the other quorum members 212 may or may not have direct contact with the rules compliance service 214. Other mechanisms may be employed such as having quorum members 212 sign a quorum token or other such entity if they should be evaluated as meeting the requirements of the quorum. For example, system 216 can pass a quorum token to quorum members 212. Those having valid RBKM can sign the token and the token can be passed to the rules compliance service 214 to evaluate whether the m of n type threshold is met for validity of the RBKM associated with system 216.

Other quorum type logic can also be employed and the above embodiments are representative only.

Figure 3:
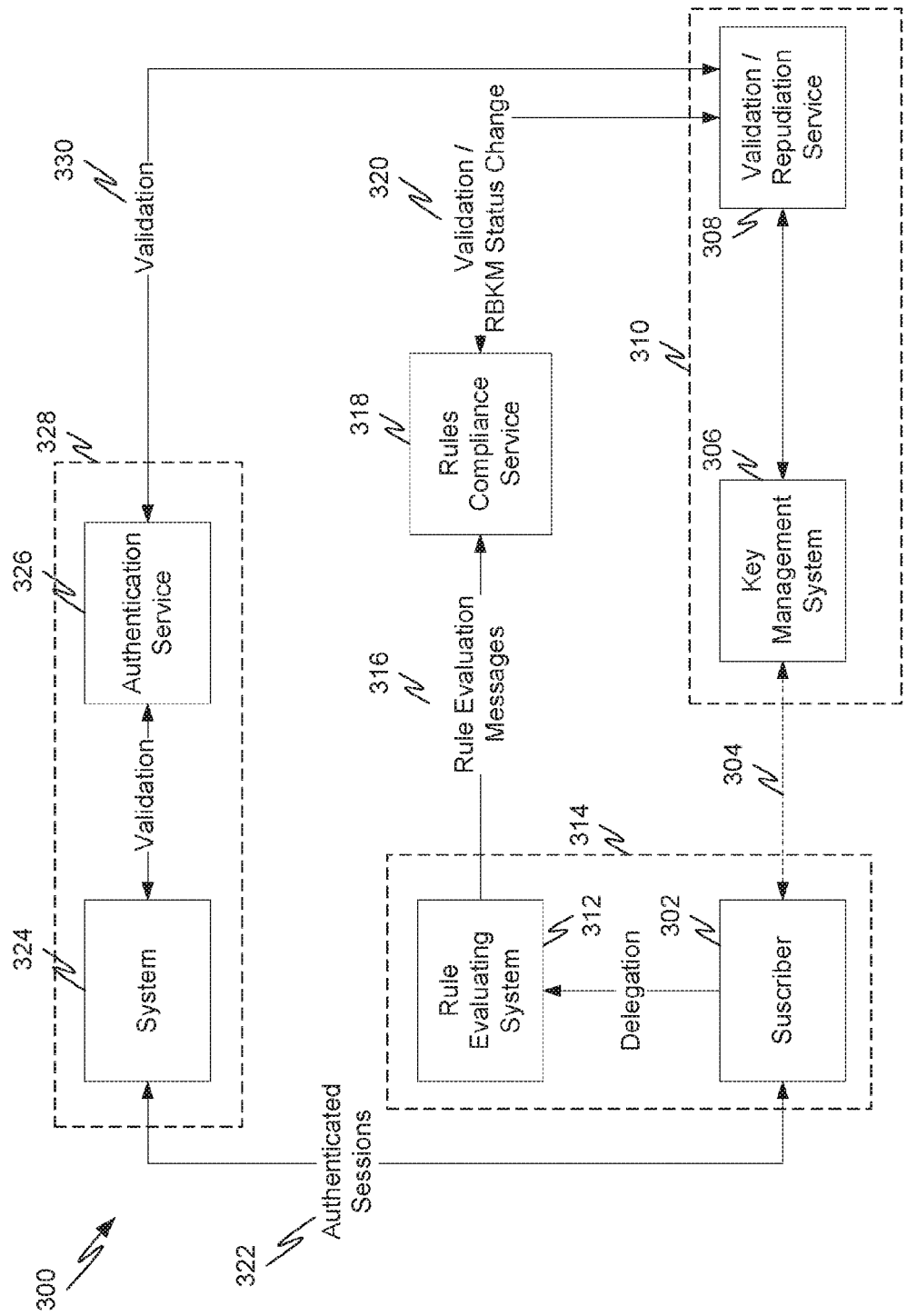
FIG. 3 illustrates representative system interactions to issue and utilize rule based key material.

FIG. 3 illustrates representative system interactions 300 to issue and utilize RBKM in a general embodiment. This embodiment may be used, for example, with SSH type authentication. In this embodiment, a subscriber 302 obtains appropriate cryptographic key material. When SSH is used for authentication, a key pair is generally generated on the subscriber system. However, a centralized key management system 306 may also either generate the key pair or direct generation of the key pair on subscriber 302 so that the key pair complies with appropriate policies such as using/assigning appropriate key properties and/or key options. Policies relating to key management on the centralized key management system 306 may also be part of a rule set associated with cryptographic key material. Interactions between the subscriber 302 and the key management system 306 are indicated by arrow 304.

While implementations using SSH for authentication do not usually refer to cryptographic key material as being embedded in or associated with certificates. Thus, the term RBKM will be used to refer to cryptographic key material and associated RBAS. Different SSH implementations may not store or relate the cryptographic key material and the RBAS in the same manner. For example, the cryptographic key material can be stored in a key file, as typically dictated by various SSH implementations. The RBAS can be stored in the key file and/or separately in a different location(s), as key options, as key properties, or in some other fashion. However, the cryptographic key material and RBAS are associated, along with other optional information, to form the RBKM. As defined above, the information that forms this RBAS can include one or more of the following information:

1. one or more rule sets, including such things as timing schedules or other timing information, quorum information, geo-fence information and so forth;

2. delegate identifier(s) and/or other delegate information for things like delegation of decryption of various items, delegation of rule evaluation, service where rule evaluation messages should be sent, delegation of verification/validation of various items, and so forth;
3. policy information;
4. key instance(s) and/or identifier(s) of associated cryptographic key material (e.g., some way to indicate the related cryptographic key material); and/or
5. other information.

Different embodiments may have different combinations of the information and store the information in different ways.

While some subscribers are able to evaluate the rule set, meaning that they have sensors or other means to determine the compliance of the subscriber in regards to the rule set, other subscribers do not. Thus, in some embodiments, aspects related to the compliance evaluation regarding the rule set can be delegated to a rule evaluating system/device 312. For example, the subscriber may be a user account located on a laptop without geo-location sensors (e.g., global positioning sensor (GPS), accelerometers, and so forth) while the geo-location aware device may be the user's mobile phone, which has the ability to determine its geo-location.

Delegation may be accomplished via a real-time authorization protocol between the rule evaluating system 312 and the subscriber 302 based on a short distance protocol such as low power Bluetooth or a near-field communication. Delegation may also be accomplished using a static authorization assignment, for example the appropriate policy may allow a user to use her specified mobile phone as a geo-location aware device and/or rules evaluating system. Thus, in some embodiments delegation uses static or pre-authorized delegation to a device or system. In other embodiments, dynamic delegation is used. In still further embodiments, both static and dynamic delegation is used. In all of these embodiments, communications between the subscriber 302 and the rule evaluating system 312 may be wireless such as over low power Bluetooth or near field communication so that delegation only occurs when the two systems are in close proximity to each other. In other embodiments wired connections can be used.

Whether delegation can occur, the conditions under which delegation can occur, the mechanism used for delegation, the authorized entities that can be delegated to and so forth may be controlled by policies or in some other way. Policies can also be hierarchical in nature so that "lower" level policies can be overridden by "higher" level policies. For example, the user can authorize a set of quorum entities, but the company can limit or override the authorization consistent with its security goals and infrastructure. Thus, in some embodiments the key management system 306 plays a role in determining authorized delegates, related conditions and/or mechanisms. In other embodiments, the subscriber 302 plays a role in determining authorized delegates, related conditions and/or mechanisms. In still further embodiments, a combination plays a role in determining authorized delegates, related conditions and/or mechanisms.

Dashed box 314 indicates that the subscriber 302 and the rule evaluating system 312 may be the same system, device, or so forth. From this point on, the description of FIG. 3 will refer to system 314 as a unit, rather than trying to differentiate embodiments where the subscriber 302 and or the rule evaluating system 312 perform various actions. However, it will be clear to one of ordinary skill in the art how to apply this description to embodiments where delegation of evaluating the rule set to the rule evaluating system 312 occurs.

Rule compliance service 318 ascertains when to change the validity status of the RBKM associated with system 314. As described elsewhere, determining the proper validity status of the RBKM associated with system 314 involves an assessment of the compliance of system 314 with one or more rule sets associated with the RBKM. Also as described elsewhere, in some embodiments, determining the proper validity status of the RBKM associated with system 314 also involves other information such as the number of authorized entities nearby system 314 creating a quorum and/or other policy information. The evaluation of the rule set is performed by different entities, depending on the embodiment. In some embodiments, the evaluation of the rule set can be performed by the rule compliance service 318. In other embodiments, the evaluation of the rule set can be performed by the system 314. In other embodiments, the evaluation of the rule set can be performed by other entities.

In some embodiments, the evaluation of the rule set of the system 314 is passed to a rule compliance service 318 so that an assessment of the compliance of the system 314 with the rule set can be ascertained. The evaluation updates are indicated in the embodiment of FIG. 3 by rule evaluation message 316. The purpose of the rule compliance service 318 is to determine when to set the status of the RBKM as valid and when to set the status of the RBKM as not valid based on the compliance of system 314 with one or more rule sets and other relevant information. The information in the rule evaluation message 316 is sufficient to allow proper assessment of the conditions relevant to this determination when coupled with information the rule compliance service 318 has access to by other means. Thus, in some embodiments all the relevant information is sent via the rule evaluation message. In other embodiments some information is sent via the rule evaluation message and other information is either known locally or access remotely or a combination thereof. For example, the rule compliance service can be implemented by or as part of a centralized key management system, such as system 310. In such an implementation, the centralized key management system may have access to all the information needed to perform the evaluation, e.g. a system timer and/or date/time for evaluating a time schedule-based rule, the authorized quorum entities, and so forth. System 310 may also be missing specific information which has to be updated by the system 314, e.g. the current geo-location of system 314. Where the rule compliance service 318 is implemented separately from the centralized key management system 310, a typical embodiment includes information to evaluate at least part of one or more rule sets which is available to the system 314 as well as other relevant information in the rule evaluation message 316. Different embodiments include either more or less information, such as the information outlined below.

In order to ascertain what the validity status of the RBKM should be, the rule compliance service 318 accesses the rule evaluation data of system 314, the rule set(s) associated with the cryptographic key material, and/or other information that may also be used to determine the validity of the RBKM. Such other information may be defined in one or more rules and contain things like a schedule (e.g., time of day, day of week, and so forth), the length of time since the last rule evaluation message, the number of authorized entities nearby the system 314 required for a quorum or any other desired information. Using the information, the rule compliance service 318 can apply various methods to determine whether to change the validity status of the RBKM. For example, the RBKM of the system 314 is valid when the system 314 is on corporate premises and it is a normal working day between the hours of 7 a.m. and 6 p.m. and at least three of five authorized mobile devices assigned to peers of the subscriber 302, digitally sign a random quorum token using near-field communication and invalid otherwise. Additionally, or alternatively, if it has been more than a pre-defined time since a rule evaluation message has been received, the RBKM of the system 314 is marked invalid. The pre-defined period of time will depend on the security requirements of the implementation, since the pre-defined period of time represents some measure of risk where the exact locations of the system 314 and/or nearby quorum entities are unknown. For example, in some embodiments 10 minutes may be a reasonable time. In a higher security environment, a shorter period of time may be desirable. In other embodiments, a longer period of time may be sufficient.

The description above assumes that the evaluation of the rule set (e.g., whether the system 314 complies with the rule set) is evaluated by the rule compliance service 318. In other embodiments, it may be possible to delegate the evaluation of all or parts of the rule set to a different system. In some embodiments, the rule evaluating device 312 (and/or the combined system 314) performs the rule evaluation. In other embodiments, the evaluation of the rule set may be delegated to a different system and/or service, such as the key management system 306 or any other system and/or service that is authorized. The identification of authorized delegates for any rule (e.g., evaluation of the location of the system relative to a geo-fence) can be determined by an additional policy or combination of policies, which ultimately comply with the entity/entities that set the overriding policy, such as the authentication service 326, the centralized key management system 306 and/or validation/repudiation service 308. In embodiments where the evaluation of the rule set is performed by the system 314 (or the delegated rule evaluating system 312), the results of the evaluation are sent to the rule compliance service 318 via the rule evaluation message 316. In further embodiments, the rule evaluation message 316 also contains information that allows the rule compliance service 318 to verify the evaluation of the rule set and/or information that allows the rule compliance service 318 to trust the evaluation of the rule set.

In some embodiments, part of the rule set allows system 314 to provide evidence of a quorum established by authorized entities nearby using a real-time authorization protocol on a short distance protocol such as low power Bluetooth or a near-field communication. For example a quorum token can be created, by having the quorum entities to digitally sign a block of data containing a time-stamp and a nonce negotiated between system 314 and the authentication service 326 and/or the rule compliance service 318. Additionally or alternatively a quorum rule might require a specific validity status of the key material authorized to create the quorum.

If a time schedule-based rule is applied, the rule compliance service 318 can be triggered autonomously by observing its system timers and setting the RBKM to invalid when update messages are not received by a specified time.

The rule evaluation message 316 is generally sent in a manner that prevents such security problems as a replay attack, man in the middle attack, and so forth. In some embodiments, a secure protocol is used to establish a secure, authenticated connection between the system 314 and the rule compliance service 318. A protocol such as TLS is a suitable choice. A more general approach is used in other embodiments. This more general approach relies on the encryption of the evaluation of the rule set along with other information to resist such attacks, such as client and server generated nonce information. One suitable formulation is:

$$\text{sgn}_{prvc}(\text{enc}_{pubs}(\text{REI} \oplus \text{nonce}_c \oplus \text{nonce}_s) \oplus \text{nonce}_s)$$

Where:
REI is the rule evaluation information for the system sending updates (e.g., the system 202);
$\text{nonce}_s$ is a nonce generated by the system sending messages (e.g., the system 202);
$\text{nonce}_s$ is a nonce generated by the system receiving the messages (e.g., the rule compliance service 218);
pubS is a public key of the system receiving the messages (e.g., the rule compliance service 218);
prvC is a private key of the system sending the messages (e.g., the system 202);
$\text{enc}_x(\ )$ is an asymmetric cryptographic algorithm (e.g., public/private key encryption scheme) where the key x is used to encrypt the data;
$\text{sgn}_x(\ )$ is a signing algorithm where the key x is used to sign the data; and
$\oplus$ represents a concatenation.

The system 302 can use various triggering events to send a rule evaluation message. Examples of suitable triggering events include, but are not limited to, an (in)sufficient quorum due to an (in)accessible authorized quorum entity or due to a switch of the validity status of the cryptographic key material of an authorized quorum entity, a time period since the last rule evaluation message (e.g., messages are sent on a periodic basis), a change in geo-location of the system 314, a time schedule-based event, and/or combinations thereof. Thus in one embodiment, the system 314 sends a rule evaluation message 316 whenever the system 314 cannot (re-) create a quorum token due to a critical number of authorized quorum entities (e.g., m of n entities) becoming inaccessible (or accessible) as well as at least every so many minutes (e.g., 10 minutes), or when it crosses a pre-defined geo-fence.

Representative examples for quorum entities and the relationship of a system like the system 314 to the quorum entities (e.g., in a quorum context) were discussed previously. In FIG. 3, quorum entities and whether the system 314 is part of a quorum context with other quorum entities is not specifically illustrated. However, those of skill in the art can readily understand how such quorum entities and/or quorum contexts may be employed in various embodiments as part of one or more rule sets.

Once the rule compliance service 318 determines what the status of the RBKM associated with the system 314 should be, it can report the status to a validation/repudiation service, such as the validation/repudiation service 308. The validation/repudiation service 308 informs entities seeking to know the status of the RBKM whether the RBKM is valid or invalid. Such a service can be separate from, or part of, the key management system 306 as indicated by dashed box 310. In one embodiment, the key management system 306 operates as a repudiation service 308 to inform entities wishing to know the status of the RBKM whether it is valid or invalid.

When the system 314 wishes to establish authenticated communication 322 with a system, such as the system 324, it initiates communication using an appropriate authentication protocol and at least the cryptographic key material. The system 324 checks the validity of the material using an authentication service 326. The authentication service 326 checks the validity of the material with the validation/ repudiation service 308. Assuming everything checks out, the system 324 can establish the authenticated session(s) 322 based upon the cryptographic key material.

In some embodiments of FIG. 3, the authentication service 326 can be part of the system 324 as indicated by box 328. In some of these embodiments, the authentication service is that aspect of the system 324 that implements the authentication protocol or that works in conjunction with the aspect of the system 324 that implements the authentication protocol.

While the description above focused on the system 314 having a RBKM, whose validity is based at least in part on the compliance of system 314 to a rule set, the same principles can be applied to the system 324. Thus, the system 324 may, in turn, have a RBKM whose validity depends, at least in part, on the compliance of the system 324 to a rule set. Thus, the rule compliance service 318 would determine the validity state of the associated RBKM. In this way, the system 314 can authenticate the system 324 (and/or the combined system 328) based on its RBKM as well to create a mutual authentication situation where both systems are authenticated, at least in part, based on the validity of their respective RBKMs.

Figure 4:
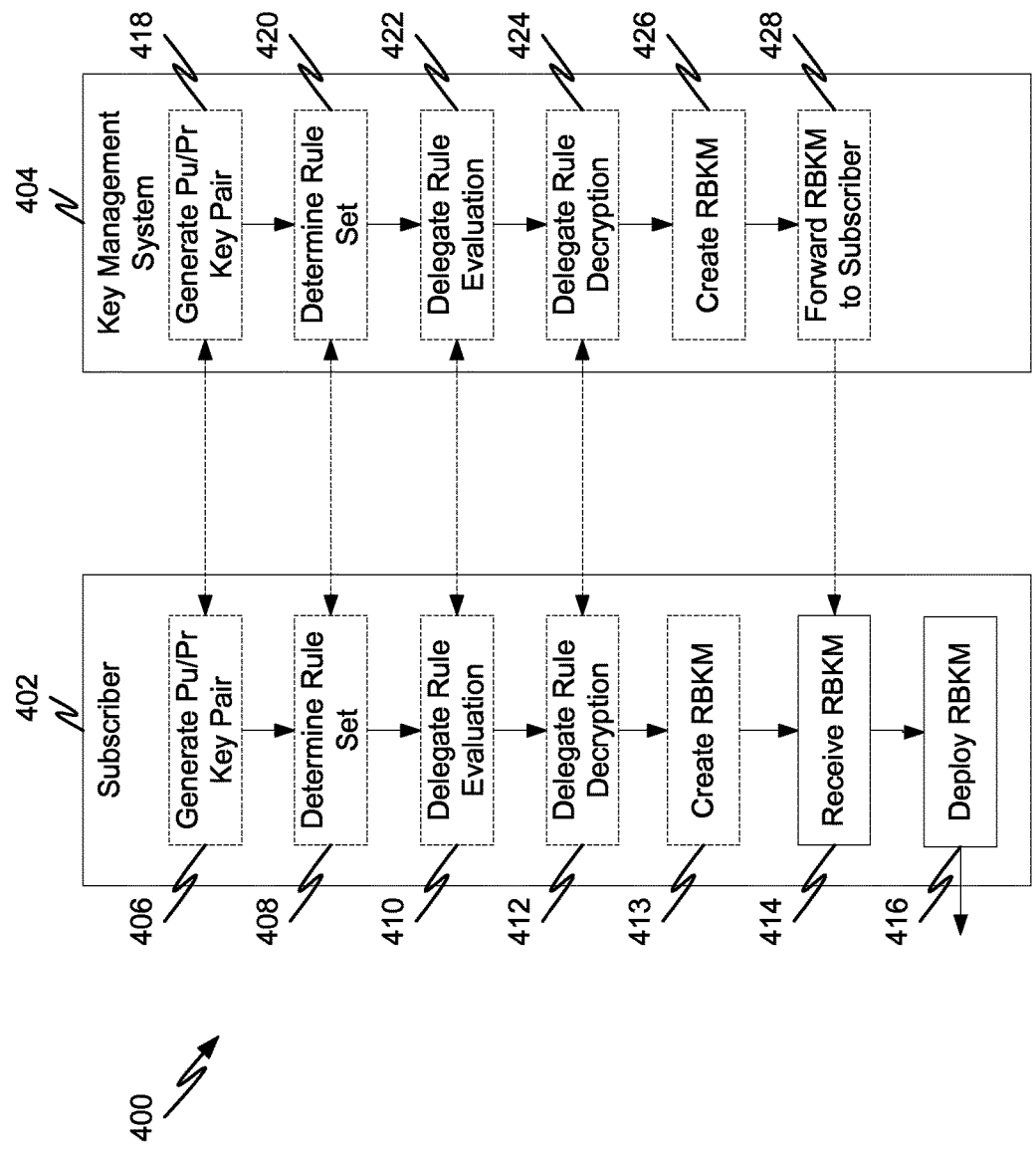
FIG. 4 illustrates a representative flow diagram between a subscriber and key management system in some embodiments.

FIG. 4 illustrates a representative flow diagram 400 between a subscriber 402 and key management system 404 in some embodiments. In order to create a key pair associated with an appropriate RBAS (e.g., RBKM). Appropriate delegations are determined and the RBKM is created and deployed appropriately. The diagram of FIG. 400 illustrates various options for these operations for various embodiments.

Operation 406 and/or operation 418 represent generating a public/private key pair for the RBKM. As discussed above, in some embodiments, the key pair would be generated on the subscriber system 402 (e.g., operation 406). In some embodiments, the key pair would be generated on the key management system 404 (e.g., operation 418). In still further embodiments, the process of generating the public/private key pair is split between the key management system 404 and the subscriber 402. In these latter embodiments, for example, the key management system 404 can access one or more policies to determine the appropriate key properties (e.g., key length, algorithm used to generate the key pair, and so forth), and the key management system 404 can initiate the appropriate key generation on the subscriber 402. Thus, information such as the "what" and "how" are determined by the key management system 404 while the actual key generation is performed by the subscriber 402. In still further embodiments, appropriate key properties are set by a combination of policies and/or by an administrator.

Operation 408 and/or operation 420 represent determining an appropriate rule set for the RBKM. The rule set to be associated with a RBKM are determined by a policy and/or policies and/or other such information and/or some other way (e.g., set by an administrator). In some embodiments, the policy and/or policies and/or other information may be known by, or available to, the subscriber 402. In these embodiments, the appropriate rule set may be determined by the subscriber 402 (e.g., operation 408). In other embodiments, the policy and/or policies and/or other information may be known by, or available to, the key management system 404. In these embodiments, the appropriate rule set may be determined by the key management system 404 (e.g., operation 420). In still further embodiments, some combination thereof may be used.

Operation 410 and/or operation 422 represent delegation of the rule evaluation. As discussed in conjunction with the embodiment of FIG. 3, various embodiments may delegate the rule evaluation to a rule evaluating system, to a rule compliance service, and/or some other system. In various embodiments, authorized delegates for this operation are identified by a policy and/or policies, an administrator, or in some other fashion. Different embodiments select delegates based on policies (e.g., authorized delegates are identified by one or more policies), from a designated list, by a system administrator, based on some policies, and/or in some other fashion. Authorized delegate(s) are identified, for example, by a uniform resource locator (URL), a uniform resource identifier (URI), and/or some other identifier, and/or combinations thereof.

In some embodiments the subscriber 402 identifies the delegate(s) for the rule evaluation (e.g., operation 410). In other embodiments, the key management system 404 identifies the delegate(s) for the rule evaluation (e.g., operation 422). In still further embodiments, a combination of the subscriber 402 and the key management system 404 identify the delegate(s) (e.g., both operation 410 and operation 422).

An obfuscation scheme such as encryption can be employed in some embodiments to conceal all or part of the rules. Such is useful, for example, if the information in the RBKM is public and there is a desire not to make the exact nature of rules public as well. In embodiments where some or all of the rules are encrypted, one or more delegates can be identified that are authorized to decrypt the encrypted rules. In various embodiments, authorized delegates for this operation are identified by a policy and/or policies, an administrator, or in some other fashion. In some embodiment, this delegation identifies one or more entities that have access to appropriate keys and/or other information to accomplish decryption. The authorized delegate(s) are identified, for example, by a uniform resource locator (URL), a uniform resource identifier (URI), and/or some other identifier such as a key ownership identifier (e.g., as defined in RFC 5280), and/or combinations thereof which can be used to contact and/or connect with the delegate.

In certain embodiments the subscriber 402 identifies the delegate(s) for the rule decryption (e.g., operation 412). In other embodiments, the key management system 404 identifies the delegate(s) for the rule decryption (e.g., operation 424). In still further embodiments, a combination of the subscriber 402 and the key management system 404 identify the delegate(s) (e.g., both operation 412 and operation 424).

Not all of the information in operations 406/418, 408/420, 410/422, 412/424 need be identified for all embodiments. Some embodiments may have some, but not all of the identified information. Some embodiments may have more information. Still other embodiments may have some of the information identified in operations 406/418, 408/420, 410/422, 412/424, but have additional information not listed in these operations. In other words, the information listed in these operations is representative, but not exclusive. However, at a minimum, embodiments include the cryptographic key material as result of the operations 406/418 and at least one rule as a result of the operations 408/420.

Once all the information has been identified, a RBKM can be created (such as a RBC for systems that use certificates) and/or the information in the RBKM can be collected and stored in the appropriate location(s). This is indicated by operation 413 and/or operation 426 depending on whether an embodiment has the information on the subscriber 402, the key management system 404 or a combination thereof.

In operation 428, the key management system 404 forwards the RBKM over to the subscriber system 402. The information is received by the subscriber system 402 in operation 414 and the RBKM (or information thereof) is deployed and/or stored appropriately in operation 416.

Figure 5:
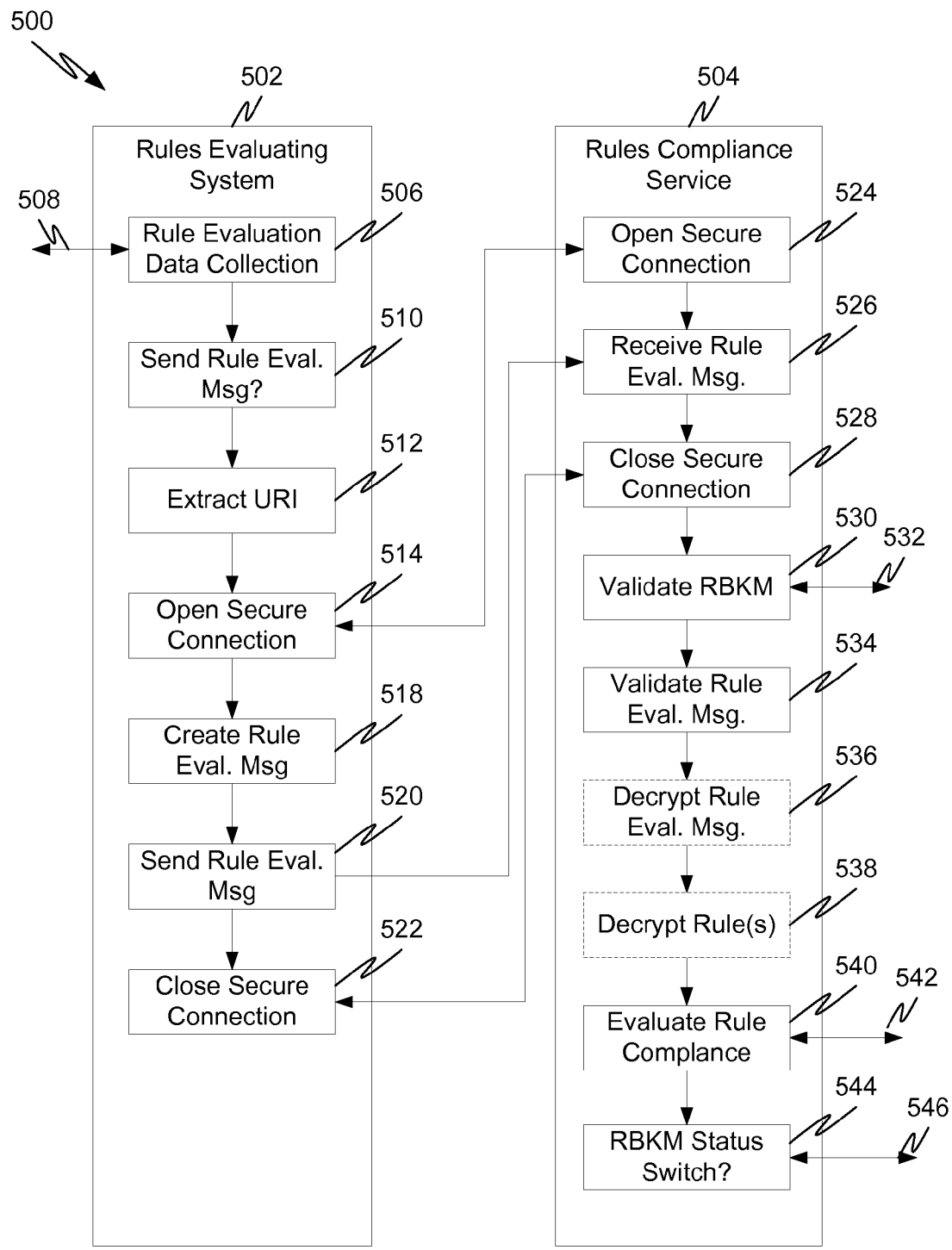
FIG. 5 illustrates a representative flow diagram between a rule evaluating system and a rules compliance service in some embodiments.

FIG. 5 illustrates a representative flow diagram 500 between a rule evaluating system 502 and a rule compliance service 504 in some embodiments. The rule evaluating system 502 may be a system that evaluates some or all of a rule set, including, for example, a geo-fence, a quorum rule, and/or so forth (e.g., system 302/312/314 of FIG. 3 and/or system 702/714/716 of FIG. 7). The rule compliance service 404 may be, for example, the rule compliance service 318 of FIG. 3 and/or the rule compliance service 720 of FIG. 7.

In operation 506, the rule evaluating system 502 collects rule evaluation data to show compliance/non-compliance with one or more rule set(s) by accessing built-in sensors, e.g. to evaluate its geo-location, determine the time schedule and so forth. Data can also be collected in some other fashion and/or from other places/systems depending on the data needed to evaluate compliance with the rules. Arrow 508 represents the retrieval of the rules-relevant data from which the rule evaluating system 502 and/or the rule compliance service 504 can determine its compliance.

Operation 510 identifies whether to send a rule evaluation message, such as when a triggering event has occurred. Triggering events can include, but are not limited to, a change of the quorum, the passage of a designated period of time since the last rule evaluation message, a time-schedule event, crossing of a pre-defined geo-fence, or some other triggering event. Thus, operation 506 and 510 may be done in reverse order if desired (e.g., the rule evaluating system 502 may not evaluate its rule compliance status until a triggering event occurs). Furthermore, if for example requesting a quorum is used as a triggering event, operation 510 may access the quorum rule as part of the decision to send the rule evaluation message.

In operation 512 the rule evaluating system 502 identifies where to send the rule evaluation message. In some embodiments, RBKM will store a URI or other identifier for the rule compliance service where rule evaluation messages should be sent. Operation 512 represents the system accessing such information to identify where to send the message.

As discussed above, the rule evaluation messages may be sent in a manner that prevents tampering or that prevents attacks such as the man in the middle attack or a replay attack or minimizes other desired security risks. Mechanisms to transfer messages in this way have been discussed elsewhere. Any of these mechanisms can be used, but for purposes of illustration, operation 514 shows a secure connection opened between rule evaluating system 502 and rule compliance service 504. This operation represents any manner to transfer the message in a way that provides sufficient security to meet the goals of the embodiment. One suitable option for many embodiments is TLS. Corresponding operation 524 on rule compliance service 504 illustrates the actions taken by rule compliance service 504 to open the secure connection.

Operation 518 represents constructing the rule evaluation message, and operation 520 represents sending the message to the rule compliance service 504. As discussed, the contents of the rule evaluation message vary from embodiment to embodiment. However, all will contain sufficient information to allow the evaluation for compliance with all or part of the rule set for the system 502. Corresponding operation 526 illustrates receipt of the message by the rule compliance service 504.

Operation 522 and operation 528 represent closing the secure connection.

Once the rule compliance service 504 has received the rule evaluation message, the service can perform the evaluation to determine whether the rule evaluating system 502 is compliant with its rule set. Based on that evaluation, the validity state of the RBKM can be set appropriately. This can be accomplished in several different ways. One way to accomplish this is to check the existing status of the RBKM, perform the evaluation and if the state should be changed, institute a change in the validity state of the RBKM. Another way is not to check the validity state of the RBKM, but to simply perform the evaluation, determine the appropriate state for the RBKM and initiate an update to the RBKM state. In this latter case, a state change may be initiated even though the validity of the RBKM is in accord with the results of the rule evaluation.

In FIG. 5, the validity state of the RBKM is checked in operation 530. This operation can be performed by accessing the appropriate state if it is available to the rule compliance service 504 or, if not, the validity of the RBKM can be determined using an appropriate service, such as the validation/repudiation service 308 of FIG. 3 and/or the service 710 of FIG. 7. Contacting such a service is illustrated by arrow 532.

Operation 534 checks the validity of the rule evaluation message. Such an operation may be desirable to ensure that the message has not been tampered with or ensure that it has no other problems.

If the message is encrypted, operation 536 decrypts the message. The rule compliance service 504 can decrypt the message if it has access to the appropriate key(s) and if it is an approved delegate. If not, the rule compliance service 504 utilizes an authorized delegate to decrypt the message.

If all or part of the rule set and/or additional data that is part of the rule evaluation message and/or rules are encrypted, the data is decrypted in operations 536 and/or 538, respectively. The rule compliance service 504 can decrypt the message if it has access to the appropriate key(s). If not, it uses an authorized delegate to decrypt the message.

Operation 540 illustrates performing the evaluation of the rule set to determine whether the rule evaluating system 502 is compliant to the rule set or not. In appropriate embodiments, all or parts of this operation can be delegated. For example, if the compliance computation is too complex or if delegation is appropriate to decrypt encrypted information. Finally operation 544 indicates that the rule compliance service 504 initiates a change in the validity of the RBKM if necessary based on its evaluation and based on other information as explained elsewhere in this disclosure. What information is used in evaluating whether a validity state change is initiated depends on the embodiment. Examples have been discussed above and another example is discussed below in conjunction with FIG. 10.

Figure 6:
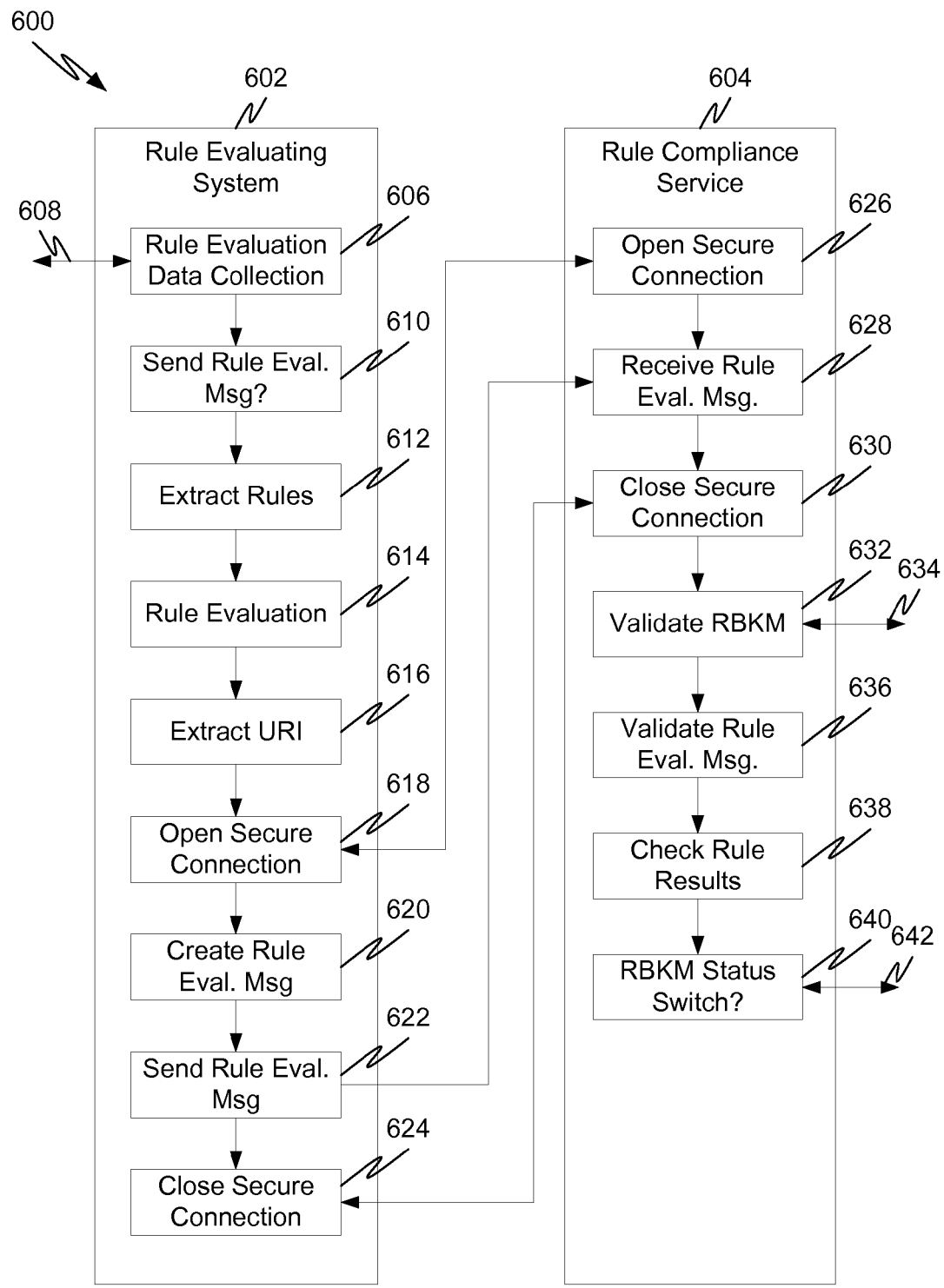
FIG. 6 illustrates a representative flow diagram between a rule evaluating system and a rules compliance service in some embodiments.

FIG. 6 illustrates a representative flow diagram 600 between a rule evaluating system 602 and a rule compliance service 604 in some embodiments. In this embodiment, the rule evaluating system performs the compliance evaluation of the rule set itself and transfers the results of the evaluation. In some embodiments, the rule evaluating system 602 also sends information that allows the rule compliance service 604 to check the calculation or otherwise verify the results are authentic. The rule evaluating system 602 may also provide evidence of a quorum when the rules include such (e.g., system 208 and/or system 216 of FIG. 2 and/or the systems 302/312/314 of FIG. 3 and/or the systems 702/714/716 of FIG. 7) by creating a quorum token digitally signed by authorized quorum entities based on a short distance protocol such as low power Bluetooth or a near-field communication as discussed above. The rule compliance service 504 may be, for example, the rule compliance service 318 of FIG. 3 and/or the rule compliance service 720 of FIG. 7.

In operation 606, the rule evaluating system 602 collects rule evaluation data to achieve compliance with the rule set by accessing built-in sensors, e.g. to evaluate its geolocation, determine the time schedule and so forth. Data can also be collected in some other fashion and/or from other places/systems depending on the data needed to evaluate compliance with the rules. Arrow 608 represents the retrieval of the relevant data from which the rule evaluating system 602 can determine its compliance.

Operation 610 identifies whether to send a rule evaluation message, such as when a triggering event has occurred. Triggering events can include, but are not limited to, a change of the quorum, the passage of a designated period of time since the last rule evaluation message, a time-schedule event, crossing of a pre-defined geo-fence, or some other triggering event. Thus, operation 606 and 610 may be done in reverse order if desired (e.g., the rule evaluating system 602 may not evaluate its policy compliance status until a triggering event occurs). Furthermore, if for example requesting a quorum is used as a triggering event, operation 610 may access the respective quorum rule as part of the decision to send the rule evaluation message.

In operation 612, rule evaluating system 602 accesses the rule set in order to be able to determine the necessary evaluations. The evaluation of the rule set is illustrated in operation 614. This evaluation determines whether the rule evaluating system 602 complies with the rule set or not. In this embodiment, the rule evaluating system 602 does not perform the entire task of determining what the validity status of its own RBKM should be. It only performs the evaluation of the rule set based on its collected data.

In operation 616 rule evaluating system 602 identifies where to send the rule evaluation message. In some embodiments, RBKM will store a URI or other identifier for the rule compliance service where rule evaluation messages should be sent. Operation 616 represents the system accessing such information to identify where to send the message.

As discussed above, the rule evaluation messages may be sent in a manner that prevents tampering or that prevents attacks such as the man in the middle attack or a replay attack. Mechanisms to transfer messages in this way have been discussed elsewhere. Any of these mechanisms can be used, but for purposes of illustration, operation 618 shows a secure connection opened between rule evaluating system 602 and rule compliance service 604. This operation represents any manner to transfer the message in a way that provides sufficient security to meet the goals of the embodiment. One suitable option for many embodiments is TLS. Corresponding operation 626 on rule compliance service 604 illustrates the actions taken by rule compliance service 604 to open the secure connection.

Operation 620 represents constructing the rule evaluation message, and operation 622 represents sending the message to the rule compliance service 604. As discussed, the contents of the rule evaluation message vary from embodiment to embodiment. However, all will contain sufficient information to allow the rules compliance service 604 to determine whether the system 602 complies with the rules. This includes the results of the evaluation performed by the system 602 and, in some embodiments, additional information to allow rules compliance service 604 to validate the rule evaluation performed by the system 602. Corresponding operation 628 illustrates receipt of the message by the rule compliance service 604.

Operation 624 and operation 630 represent closing the secure connection.

Once the rule compliance service 604 has received the rule evaluation message, the service can determine the proper state of the RBKM and set it appropriately. As discussed with FIG. 5, this can be accomplished in several different ways. One way to accomplish this is to check the existing status of the RBKM, perform the evaluation and if the state should be changed, institute a change in the validity state of the RBKM. Another way is not to check the validity state of the RBKM, but to simply perform the evaluation, determine the appropriate state for the RBKM and initiate an update to the RBKM state. In this latter case, a state change may be initiated even though the validity of the RBKM is in accord with the results of the evaluation of the rule set.

In FIG. 6, the validity state of the RBKM is checked in operation 632. This operation can be performed by accessing the appropriate state if it is available to the rule compliance service 604 or, if not, the validity of the RBKM can be determined using an appropriate service, such as the validation/repudiation service 308 of FIG. 3 and/or service 710 of FIG. 7. Contacting such a service is illustrated by arrow 634.

Although not depicted in FIG. 6, if the rule evaluation message is encrypted or any of the data included in the rule evaluation message is encrypted, decryption can be performed as described previously. Delegation of the decryption can also occur in some embodiments.

Operation 636 checks the validity of the rule evaluation message. Such an operation may be desirable to ensure that the message has not been tampered with or ensure that it has no other problems.

If the message contains information that allows the rule compliance service 604 to check the rule evaluation performed by the rule evaluating system 602, the check is performed in operation 638. Such a check may take the form of verifying proof material associated with the calculation, verifying the identity of the system that performed the calculation, checking signature data, recalculating the evaluation of the rule set, or any other such checks or verification.

Finally operation 640 and arrow 642 indicates that the rule compliance service 604 initiates a change in the validity of the RBKM if necessary. What information is used in evaluating whether a state change is initiated depends on the embodiment. Examples have been discussed above and another example is discussed below in conjunction with FIG. 10.

Figure 7:
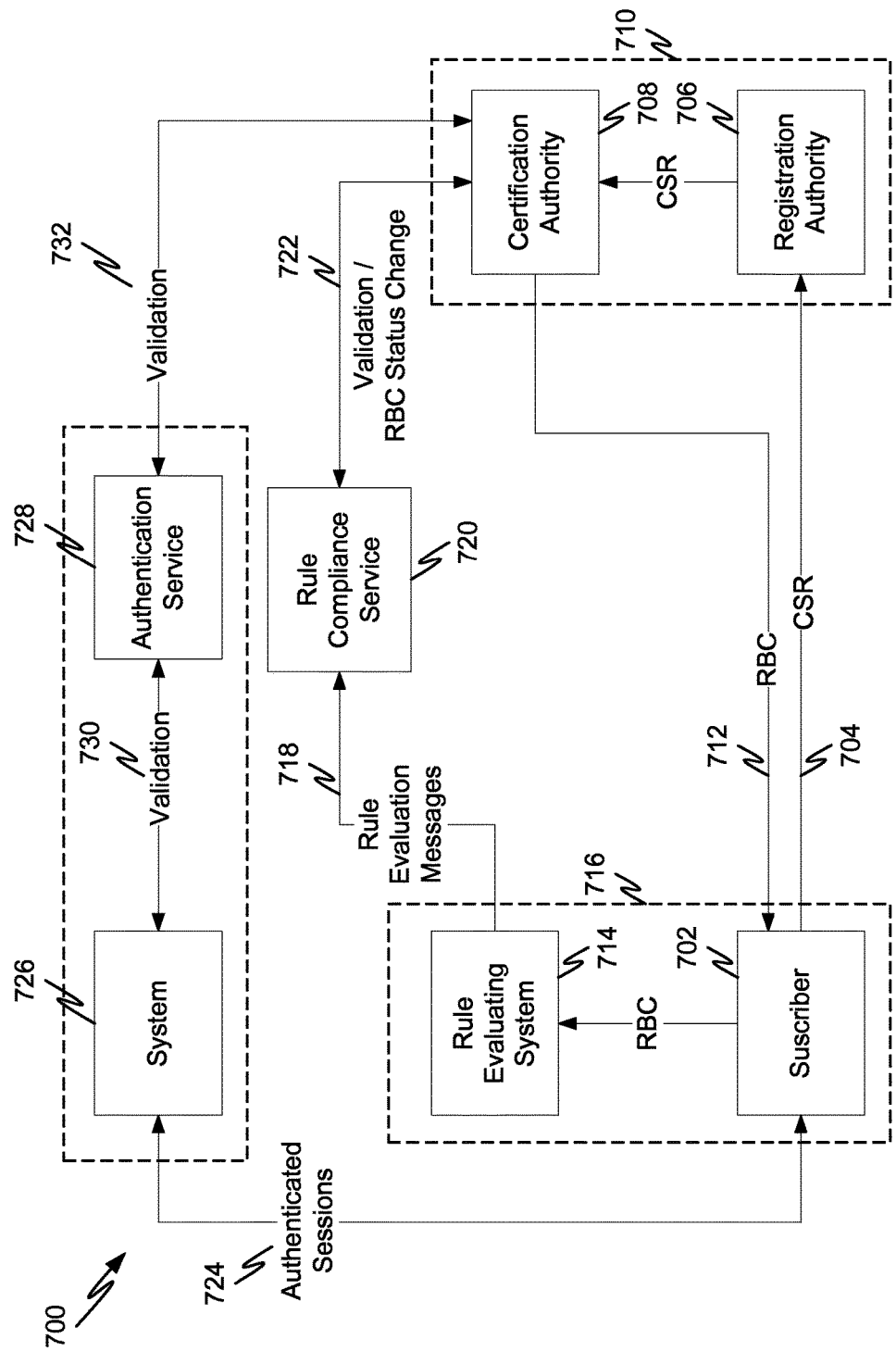
FIG. 7 illustrates representative system interactions to issue and utilize rule based certificates.

FIG. 7 illustrates representative system interactions 700 to issue and utilize rule-based certificates according to one embodiment. Such an embodiment is useful, for example, if an X.509 certificate forms the basis for the RBC. Thus, the RBKM are RBCs in this embodiment. The associated PKI can for the basis for issuing and validating RBC, and other purposes as described below. The interactions are similar, although not necessarily identical, to those discussed in conjunction with FIG. 3 above and many of the same considerations apply.

In this embodiment, a subscriber 702 obtains appropriate cryptographic key material by creating a private/public key pair and embedding the public key into a certificate signing request (CSR) and sending the CSR 704 to an appropriate registration authority 706. In some embodiments, the rule set are included as part of the CSR. In other embodiments, the rule set are provided by another entity and embedded in the RBC by the certification authority as described below.

While some subscribers are able to evaluate the rule set, meaning that they have sensors or other means to determine compliance of the subscriber with the rule set, other subscribers are not. Thus, in some embodiments, aspects related to the compliance evaluation regarding the rule set can be delegated to a rule evaluating system/device 714. For example, the subscriber may be a user account located on a laptop without geo-location and/or positioning sensors (e.g., global positioning sensor (GPS), accelerometers, and so forth) while the geo-location aware device may be the user's mobile phone, which has the ability to determine its geo-location.

Delegation may be accomplished via a real-time authorization protocol between the rule evaluating system 714 and the subscriber 702 based on a short distance protocol such as low power Bluetooth or a near-field communication. Delegation may also be accomplished using a static authorization assignment, for example the appropriate policy may allow a user to use her specified mobile phone as the geo-location aware device. Thus, in some embodiments delegation uses static or pre-authorized delegation to a device or system. In other embodiments, dynamic delegation is used. In still further embodiments, both static and dynamic delegation is used. In all of these embodiments, communications between the subscriber 702 and the rule evaluating system 714 may be wireless such as over low power Bluetooth or near field communication so that delegation only occurs when the two systems are in close proximity to each other. In other embodiments wired connections can be used.

Whether delegation can occur, the conditions under which delegation can occur, the mechanism used for delegation, the authorized entities that can be delegated to and so forth may be controlled by policies or in some other way. Policies can also be hierarchical in nature so that "lower" level policies can be overridden by "higher" level policies. For example, the user can authorize a set of quorum entities, but the company can limit or override the authorization consistent with its security goals and infrastructure. Thus, in some embodiments some management entity (e.g., certificate management system, administrator, and so forth) plays a role in determining authorized delegates, related conditions and/or mechanisms. In other embodiments, the subscriber 702 plays a role in determining authorized delegates, related conditions and/or mechanisms. In still further embodiments, a combination plays a role in determining authorized delegates, related conditions and/or mechanisms.

Dashed box 716 indicates that the subscriber 702 and the rule evaluating system 714 may be the same system, device, or so forth. From this point on, the description of FIG. 7 will refer to system 716 as a unit, rather than trying to differentiate embodiments where the subscriber 702 and/or the rule evaluating system 714 perform various actions. However, it will be clear to one of ordinary skill in the art how to apply this description to embodiments where delegation of rule evaluation to the rule evaluating system 714 occurs.

In some embodiments, additional information (in addition to the rule set described above) included in the CSR can include, but is not limited to identifiers and other information related to delegates (e.g., rule evaluating system 714, systems that are authorized to decrypt and/or validate encrypted information, etc.), policy information that describes conditions for the RBC state to change, and so forth. As with the rule set, this information may be provided by another entity and made part of the RBC as described below. In summary, a CSR may include one or more of the following in any combination:

1. one or more rule sets, including such things as timing schedules or other timing information, quorum information, geo-fence information and so forth;
2. delegate identifier(s) and/or other delegate information for things like delegation of decryption of various items, delegation of rule evaluation, service where rule evaluation messages should be sent, delegation of verification/validation of various items, and so forth;
3. policy information;
4. key instance(s) and/or identifier(s) of associated cryptographic key material (e.g., some way to indicate the related cryptographic key material); and/or
5. other information.

This information may also be part of the issued RBC.

When the CSR is received by registration authority 706, the registration authority validates/verifies the CSR and, in some embodiments, the information included in the CSR. For example, the registration authority 706 can vet the subscriber's claim for the issuance of the RBC. If the subscriber is not authorized to submit a CSR for the RBC it desires, the CSR can be rejected. The certification authority can also check for the applicability of any templates and/or template information applicable to the CSR. If possible, the registration authority 706 also validates/verifies the other information in the CSR such as any of the information listed above.

Templates and template information are used in some embodiments to provide any or all of the information in the CSR. As an example, an administrator determines that a subscriber submitting a CSR requests access to a high-security environment to which he is only granted if at least one of two security guards and/or two of three of the subscriber's peers are in closest vicinity and only on weekdays between 7 a.m. and 5 p.m. A template can provide the corresponding rule set for all CSRs created by subscribers requesting access to the same high-security environment. Thus, the rule set are provided by an authorized entity and the registration authority 706 uses templates to enforce and simplify the process. In some embodiments, rules and/or policies can determine what the registration authority 706 does with conflicting and/or inconsistent and/or additional information coming from the subscriber 702 and/or the template.

Once the certification authority 706 finishes validating the CSR and/or the information in the CSR, as well as utilizing any applicable templates and/or template information, the registration authority 706 forwards the CSR to the certification authority 708.

The certification authority 708 issues the RBC according to its policies and applies any templates and/or template information. The certification authority 708 can also embed the URI and/or other identifier for the rule compliance service (e.g., 720) that should receive rule evaluation messages. The certification authority can also encrypt the RBAS part of the certificate and/or specific information therein like the all or part of the rule set.

The dashed box 710 indicates that certification authority 708 and registration authority 706 may be the same system in some embodiments. Thus, a reference to a combined system (e.g., the system 710) should be taken in this disclosure to also be a reference to the particular individual system (e.g., the certification authority 708 or the registration authority 706) as appropriate.

The rule compliance service 720 ascertains when to change the validity status of the RBC associated with the system 716. As described elsewhere, determining the proper validity status of the RBC associated with the system 716 involves an assessment of the compliance of the system 716 with the rule set. Also as described elsewhere, in some embodiments, determining the proper validity status of the RBC associated with the system 716 also involves other information such as the time since an evidence for a quorum or other condition for the system 716 has been presented and/or policy information. The rule evaluation is performed by different entities, depending on the embodiment. In some embodiments, the rule evaluation can be performed by the rule compliance service 720. In other embodiments, the rule evaluation can be performed by the system 716 or partly by the system 716. In other embodiments, the rule evaluation can be performed by other entities.

In some embodiments, upon a triggering event, the rule evaluation of the system 716 is passed to a rule compliance service 720 so that an assessment of the compliance of the system 716 in regards to the rule set can be ascertained. The rule evaluation updates are indicated in the embodiment of FIG. 7 by rule evaluation message 718. The purpose of the rule compliance service 720 is to determine when to set the status of the RBC as valid and when to set the status of the RBC as not valid based on the evaluation of the rule set of the system 716 and other relevant information. The information in the rule evaluation message 718 is sufficient to allow proper assessment of the conditions relevant to this determination when coupled with information the rule compliance service 720 has access to by other means. Thus, in some embodiments all the relevant information is sent via the rule evaluation message. In other embodiments some information is sent via the rule evaluation message and other information is either known locally or access remotely or a combination thereof. A typical embodiment includes rule evaluation data available to the system 716 as well as other relevant information in the rule evaluation message. Such can be determined, for example, by sending the RBC in the rule evaluation message 718 along with relevant information available to the system 716. Different embodiments include either more or less information, such as the information outlined below.

In one representative embodiment, in order to ascertain what the status of the RBC should be, the rule compliance service 720 accesses the evaluation data of the system 716, the rule set associated with the RBC, and/or other information that may also be used to determine the validity of the RBC. Such other information may contain things like a schedule (e.g., time of day, day of week, and so forth), the length of time since the last rule evaluation message, the number of authorized entities nearby the system 716 required for a quorum or any other desired information. Using the information, the rule compliance service 720 can apply various methods to determine whether to change the validity status of the RBC. For example, the RBKM of the system 716 is valid when the system 716 is at an authorized remote location (defined by geo-fence information) and it is not a holiday and the time is between 8 p.m. and 11 p.m. and the cryptographic key material of at least one of two other of two geo-location aware devices (e.g., one of a defined quorum) has an active validity status. Thus, a rich rule set and conditions, which can be different for different rule sets, can be applied to the validity status of the RBC. Additionally, or alternatively, if it has been more than a pre-defined time (e.g., 10 minutes or other time appropriate to the security environment) since a rule evaluation message has been received, the RBC of the system 716 is marked invalid.

The description above assumes that the rule evaluation (e.g., whether the system 716 complies to a time-based schedule) is evaluated by the rule compliance service 720. In other embodiments, it may be possible to delegate more complex evaluations to a different system. In some embodiments, the rule evaluating device 714 (and/or the combined system 716) performs the evaluation. In other embodiments, the all or part of the evaluation of the rule set may be delegated to a different authorized system and/or service. The identification of authorized delegates for this aspect (e.g., evaluation of the location of the system relative to a geo-fence) can be determined by a policy or combination of policies. Furthermore, delegation can be conditional and based on factors such as proximity to a number of authorized quorum devices/systems, location of the system associated with the RBC, time of day, connectivity, and/or other information. In embodiments where the rule evaluation is performed by the system 716 (or the delegated rule evaluating system 714), the results of the evaluation are sent to the rule compliance service 720 via the rule evaluation message 718. In further embodiments, the rule evaluation message 718 also contains information that allows the rule compliance service 720 to verify the rule evaluation and/or information that allows the rule compliance service 720 to trust the rule evaluation of system 716.

The rule evaluation message 718 is generally sent in a manner that prevents such security problems as a replay attack, man in the middle attack, and so forth. In some embodiments, a secure protocol is used to establish a secure, authenticated connection between the system 716 and the rule compliance service 720. A protocol such as TLS is a suitable choice. A more general approach is used in other embodiments. This more general approach relies on the encryption of the rule evaluation information along with other information to resist such attacks, such as client and server generated nonce information. One suitable formulation is:

$$\text{sgn}_{prvC}(\text{enc}_{pubS}(REI \oplus \text{nonce}_c \oplus \text{nonce}_s) \oplus \text{nonce}_c)$$

Where:
REI is the rule evaluation information for the system sending updates (e.g., the system 616);
$\text{nonce}_c$ is a nonce generated by the system sending updates (e.g., the system 616);
$\text{nonce}_s$ is a nonce generated by the system receiving the updates (e.g., the rule compliance service 620);
pubS is a public key of the system receiving the updates (e.g., the rule compliance service 620);
prvC is a private key of the system sending the updates (e.g., the system 616);
$\text{enc}_x(\ )$ is an asymmetric cryptographic algorithm (e.g., public/private key encryption scheme) where the key x is used to encrypt the data;
$\text{sgn}_x(\ )$ is a signing algorithm where the key x is used to sign the data; and
$\oplus$ represents a concatenation.

The system 616 can use various triggering events to know when to send a rule evaluation message. Examples of suitable triggering events include, but are not limited to, an (in-) sufficient quorum due to an (in-) accessible authorized quorum entity or due to a switch of the validity status of the cryptographic key material of an authorized quorum entity, a time period since the last rule evaluation message (e.g., messages are sent on a periodic basis), a change in geo-location of the system 716, a time schedule-based event, and/or combinations thereof. Thus in one embodiment, the system 716 sends a rule evaluation message 718 whenever the system 716 crosses a geo-fence, as soon as the quorum changes, as well as at least every so many minutes (e.g., 10 minutes).

Once the rule compliance service 720 determines what the status of the RBC associated with the system 718 should be, it can report the status to a validation/repudiation service, such as certification authority 710. The certification authority 710 informs entities seeking to know the status of the RBC whether the RBC is valid or invalid. Initiating a status change in the context of PKI can be accomplished in several ways. The PKI uses certificate revocation lists (CRL) and Delta CRLs to track certificates that have been revoked and are no longer valid. One mechanism that some embodiments use is to revoke the status of RBCs that are no longer valid. When the system, such as system 716, complies with the rule set, so that the RBC can be reinstated, a process could be started to issue a new RBC to the system. This embodiment can increase the overall complexity of the implementation due to the need to generate a new key pair and issue a new certificate every time the certificate should be reinstated.

Another embodiment utilizes the ability of the PKI to indicate why a specific certificate has been revoked. A certificate can be temporarily suspended by assigning the reason code certificateHold. Once listed as a revoked certificate in a published CRL, the corresponding certificate will be repudiated by relying parties until either a subsequently published CRL removes the certificate's serial number from its list of revoked certificates or—if applicable—a Delta CRL marks the certificate's entry with the reason code removeFromCRL. Thus, in this embodiment, the rule compliance service would initiate a validity status change to invalid by indicating the relevant RBC should be revoked and attaching the certificateHold reason code. The revoked certificate would then be included in the CRL with the attached certificateHold reason code. When the certificate should be reinstated, the rule compliance service would initiate a change to remove the certificate from the CRL or—if applicable—a Delta CRL marks the certificate's entry with the reason code removeFromCRL.

When the system 716 wishes to establish authenticated communication with a system, such as the system 726, it initiates communication using an appropriate authentication protocol (e.g., TLS) using the X.509 certificate with the RBC information. The system 726 checks the validity of the material using an authentication service 728. The authentication service 728 checks the validity of the material by checking CRL, Delta CRL and/or by querying an online certificate status protocol (OCSP) responder. This is illustrated in FIG. 7 by validation 732 which queries certification authority 708 and/or PKI 710. Assuming everything checks out, the system 726 can establish the authenticated session(s) 724 based upon the cryptographic key material.

In some embodiments of FIG. 7, the authentication service 728 can be part of the system 726 as indicated by the dashed box surrounding them. In some of these embodiments, the authentication service is that aspect of the system 726 that implements the authentication protocol or that works in conjunction with the aspect of the system 726 that implements the authentication protocol.

While the description above focused on the system 716 having a RBC, whose validity is based at least in part on the compliance of system 716 with a rule set, the same principles can be applied to the system 726. Thus, the system 726 may, in turn, have a RBC whose validity depends, at least in part, on the compliance of the system 726 to a rule set. Thus, the system 726 would send rule evaluation messages to a rule compliance service such as rule compliance service 720 which would then determine the validity state of the associated RBC. In this way, the system 716 can authenticate the system 726 (and/or the combined system 726 and authentication service 728) based on its RBC as well to create a mutual authentication situation where both systems are authenticated, at least in part, based on the validity of their respective RBCs.

Figure 8:
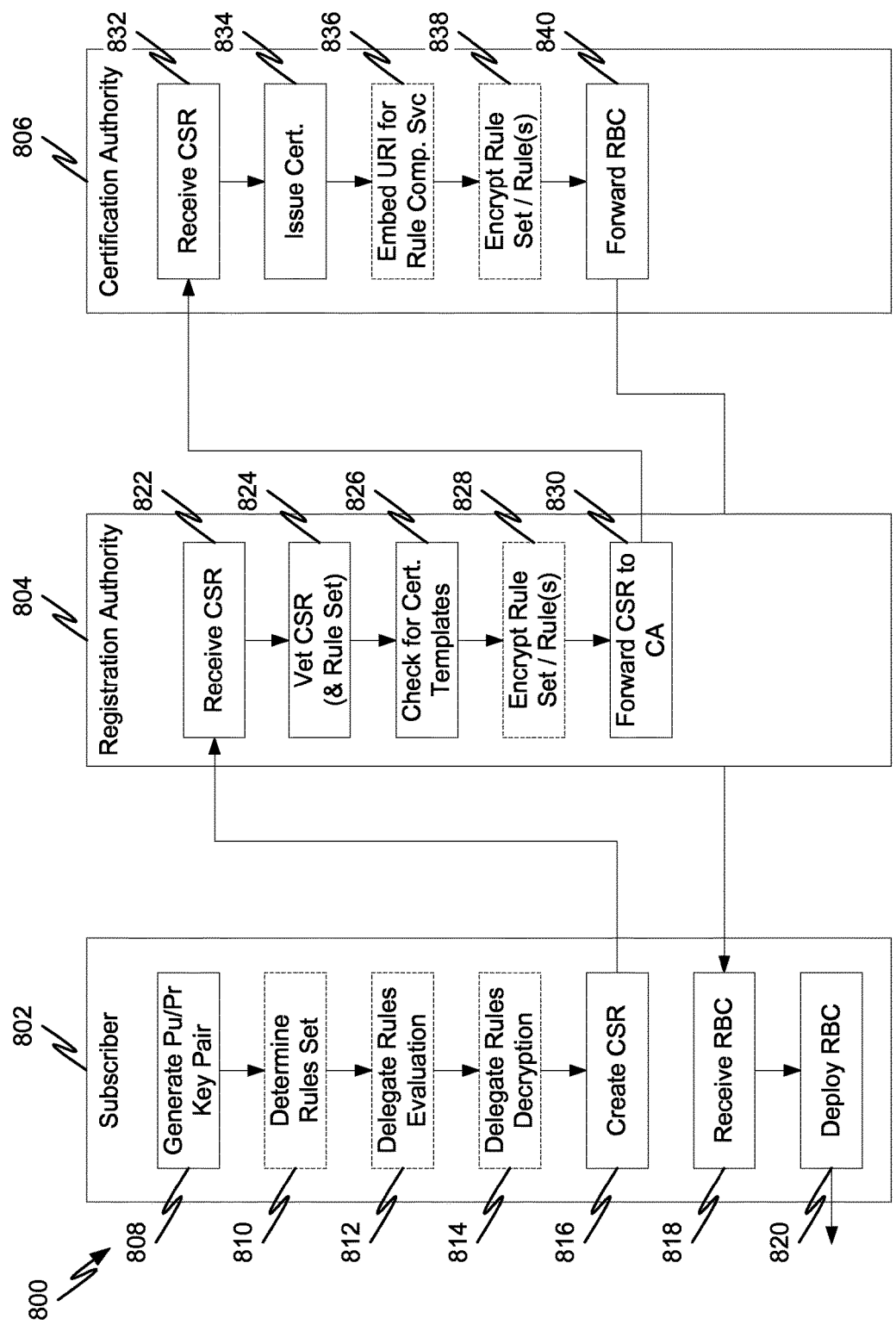
FIG. 8 illustrates a representative flow diagram between a subscriber, a registration authority and a certification authority.

FIG. 8 illustrates a representative flow diagram 800 between a subscriber 802, a registration authority 804 and a certification authority 806, such as those illustrated in FIG. 7.

Operation 808 represents generating a public/private key pair for the RBC. In some embodiments, the key pair would be generated on the subscriber system 802 (e.g., operation 808). In some embodiments, a policy or other system (e.g., a certificate or credential management system) would either generate the key pair or would initiate generation of the key pair on the subscriber system 802 with appropriate options and in an appropriate manner to ensure the key pair complies with one or more policies. In other words, a certificate/credential management system can access one or more policies to determine the appropriate key properties (e.g., key length, algorithm used to generate the key pair, and so forth), and can initiate the appropriate key generation on the subscriber 802. In other embodiments, the subscriber system 802 has access to one or more policies, information from administrators, or can access the appropriate key properties so that it will generate a key pair that complies with all relevant security requirements.

Operation 810 represents identifying an appropriate rule set for the RBC. The rule set to be associated with a RBC is determined by a policy and/or rule set and/or other such information and/or some other way (e.g., set by an administrator). In some embodiments, the policy and/or policies and/or other information may be known by, or available to, the subscriber 802. In these embodiments, the appropriate rule set may be determined by the subscriber 802 (e.g., operation 810). In other embodiments, the policy and/or policies and/or other information may be known by, or available to, some sort of certificate/credential management system. In these embodiments, the appropriate rule set may be determined by that system and retrieved by the subscriber 802. Still further embodiments use templates and/or template information as described in FIG. 7 to identify an appropriate rule set for the certificate. In these embodiments, registration authority 804 and/or certification authority 806 will supply the rule set.

Operation 812 represents delegation of rule evaluation. As discussed in conjunction with the embodiment of FIGS. 3 and 7, various embodiments may delegate the rule evaluation to a rule evaluating device, to a rule compliance service, and/or some other system. Different embodiments select delegates based on policies (e.g., authorized delegates are identified by one or more policies), from a designated list, by a system administrator, based on some policies, and/or in some other fashion. Authorized delegate(s) are identified, for example, by a uniform resource locator (URL), a uniform resource identifier (URI), and/or some other identifier, and/or combinations thereof.

In some embodiments the subscriber 802 identifies the delegate(s) for the rule evaluation (e.g., operation 812). In other embodiments, another system identifies the delegate(s) for rule evaluation and subscriber 812 retrieves the appropriate information. In still further embodiments, the registration authority 804 and/or the certification authority 806 provide the information via templates and/or template information as explained elsewhere.

An obfuscation scheme such as encryption can be employed in some embodiments to conceal the rule set. Such is useful, for example, if the information in the RBC is public and there is a desire not to make the exact nature of the rule set public as well. In embodiments where the all or part of the rule set is encrypted, one or more delegates can be identified that are authorized to decrypt the encrypted rules. In various embodiments, authorized delegates for this operation are identified by a policy and/or policies, an administrator, or in some other fashion. In some embodiment, this delegation identifies one or more entities that have access to appropriate keys and/or other information to accomplish decryption. The authorized delegate(s) are identified, for example, by a uniform resource locator (URL), a uniform resource identifier (URI), and/or some other identifier such as a key ownership identifier (e.g., as defined in RFC 5280), and/or combinations thereof which can be used to contact and/or connect with the delegate.

In certain embodiments the subscriber 802 identifies the delegate(s) for rule decryption (e.g., operation 814). In other embodiments, another system identifies the delegate(s) for rule decryption and the subscriber 802 retrieves the relevant information. In still further embodiments, the registration authority 704 and/or the certification authority 806 provide the information via templates and/or template information as explained elsewhere.

Not all of the information in operations 810, 812 and 814 need be identified for all embodiments. Some embodiments may have some, but not all of the identified information. Some embodiments may have more information. Still other embodiments may have some of the information identified in operations 810, 812 and 814 but have additional information not listed in these operations. In other words, the information listed in these operations is representative, but not exclusive. However, at a minimum, embodiments include the cryptographic key information as result of the operation 808 and at least one rule as a result of the operation 810. If templates are employed, in addition to or instead of a rule supplied by the subscriber, rules may be determined by the template.

Once all the information has been identified, a CSR for the RBC can be created and sent to the registration authority 804 as indicated by operations 816 and 822.

Once the registration authority 804 receives the CSR, the registration authority 804 verifies the information that it can verify in operation 824. This includes, but is not limited to, verifying the CSR itself along with the rule set and other information in the CSR.

In operation 826 the registration authority 804 checks for templates and/or template information that should be utilized as part of the CSR. The use of templates and/or template information has been previously explained.

If all or part of the rule set are to be encrypted and if the rules are not already encrypted, the registration authority 804 may encrypt the information in operation 828. The use of encryption to obscure the rule set has been previously discussed.

Once the registration authority 804 has verified all information, added information from templates, and/or encrypted the data necessary, the registration authority 804 forwards the CSR to the certification authority 806 as indicated in operations 830 and 832.

The certification authority 806 that receives the CSR issues the RBC (such as an X.509 certificate with embedded RBAS information) according to its policies and procedures in operation 834. The certification authority 806 can also optionally embed the URI for the rule compliance service that should be used with the certificate in operation 836. Also optionally, the certification authority 806 can encrypt all or part of the rule set as indicated in operation 838 to the extent that the information is not already encrypted.

Once the RBC is created, the certification authority 806 forwards the RBC to the subscriber 802 as indicated by operations 840 and 818. The subscriber 802 then deploys the RBC as appropriate (e.g., to a delegate).

Figure 9:
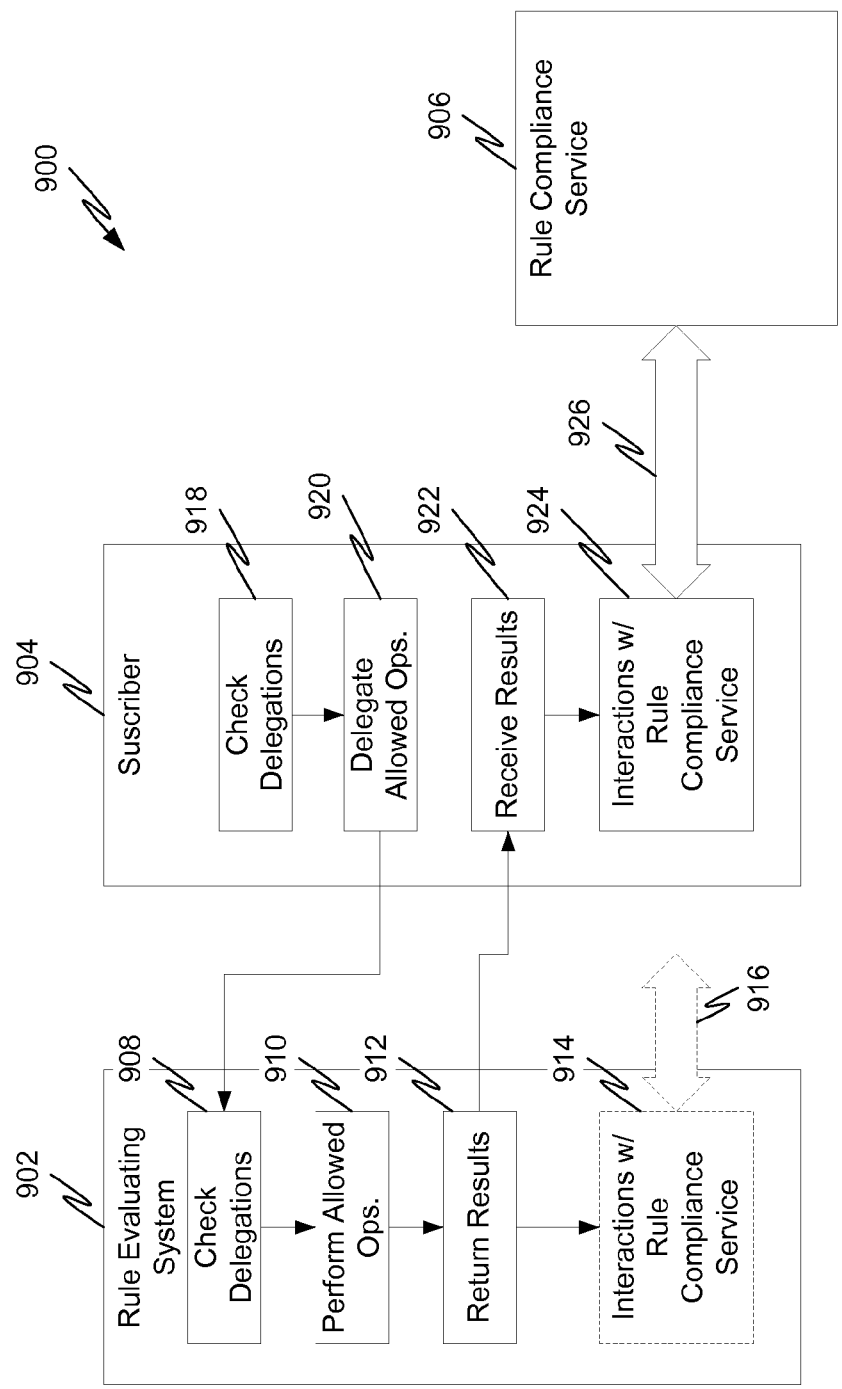
FIG. 9 illustrates a representative flow diagram between a rule evaluating system, a subscriber and a rules compliance service in some embodiments.

FIG. 9 illustrates a representative flow diagram 900 between a rule evaluating system 902, a subscriber 904 and a rule compliance service 906 in some embodiments. This diagram is intended to illustrate an example embodiment of a subscriber 904 working with a rule evaluating system 902 that has been delegated certain operations (e.g., such as the operations discussed in conjunction with the subscribers of FIGS. 3, 4, 7 and 8). In most, if not all, embodiments, any operation that would be performed by a rule evaluating subscriber can be delegated to a rule evaluating system working with a subscriber as a delegate. However, some operations will more naturally be performed at one and/or the other in the situation where a non-rule evaluating subscriber works with a rule evaluating system as a delegate. As discussed elsewhere, a rule evaluating delegate working with a non-rule evaluating subscriber can communicate and/or establish the delegation using a static delegation or some form of short-range protocol and/or technology such as a wired connection, low power Bluetooth, near-field communication and such. The purpose of using these type of connections, protocols, and technologies is to help ensure that the device that is able to perform a rule evaluation is in close proximity to the device that is not. Otherwise, it may be possible to report incorrect information, thereby feigning compliance with a rule set, to the non-rule evaluating subscriber.

The subscriber 904 checks its delegations in operation 918. This operation identifies the whether an operation should be delegated and, if so, which entity it should be delegated to. Operation 920 establishes the delegation with the appropriate rule evaluating system 902. As explained elsewhere, the delegation can be dynamic based on proximity and/or other information of the delegate to the subscriber 904, or the delegation can be static (e.g., established before hand). In the static case, certain information and/or characteristics can be checked before the delegate is actually allowed to perform the action (such as checking for proximity of the delegate, for example).

Operation 908 checks the delegation and ensures the rule evaluating system 902 is capable of carrying out the delegated operation, that the proper system is requesting the operation, and so forth. Operation 910 illustrates the rule evaluating system 902 performing the delegated operations and the results are returned in operation 912.

Once the results are received (e.g., operation 922), the subscriber 804 can forward the results or, for example, create a rule evaluation message sent to the rule compliance service 906 as indicated in operation 924. Alternatively, or additionally, interactions with the rule compliance service 906 can be performed by the rule evaluating system 902 as indicated by operation 914 and arrow 916.

As noted in the definitional section, a rule set can include such things as one or more time schedules (e.g., times at which the cryptographic key material should be valid and/or invalid, the time at which an update message should be sent and/or received, and so forth), quorum information, geofence information, and/or other rules. A rule set can also have associated logic to combine the outcome of individual rules to reach a determination of what the proper validity state should be so that the validity state can be based on a combination of various conditions and/or logic. When a service is used to evaluate compliance with whatever rules are associated with RBKM, some rules may be evaluated without information from the device where the RBKM applies and some may not. For example, when a rule includes geo-fence information, evaluation of whether a system is inside or outside of the geo-fence is based on the location of the system. Thus, if a service, such as the rules compliance service 318 of FIG. 3 or the rules compliance service 720 of FIG. 7 are to perform such an evaluation, they would need to know the location of the system. As previously discussed, such information can be made available to a rules compliance service through a rules evaluation message (e.g., 316 of FIG. 3 and/or 718 of FIG. 7) or in some other fashion.

However, evaluation of certain rules may not need information made available through an update message. For example, if validity of the RBKM is based, at least in part, on whether the last rules evaluation message was received no longer than a set time ago, then no update message is really needed to perform the evaluation. The service would know when the last update message was received and the service is capable of measuring time without receiving such in a rules evaluation message, therefore the service can evaluate compliance with such a rule independent of whether a message is received or not (although compliance depends on receiving a message in a given time period from the last received message). As another example, if RBKM contains a rule that states that the cryptographic key material is not valid on a holiday, the service can evaluate the rule without receiving information on whether "today" is a holiday in a rules evaluation message, although the information may be retrieved from a different information source.

In still other instances, whether a rules evaluation message is needed to determine compliance will depend on the details of the rule. Thus, if the quorum context contains not only the system with the RBKM but also other quorum entities, compliance with a quorum rule may not be evaluated in some instances without receipt of a rules evaluation message (e.g., see context 210, quorum entity 212, system 216 and rules compliance service 214 all of FIG. 2). If, however, the quorum context does not contain the system with the RBKM and the quorum context members have their own connection to the rules compliance service, the rules compliance service may be able to evaluate compliance with the rule whether or not the system with the RBKM sends its rules compliance message as long as the system can determine the appropriate state of the quorum members (e.g., see context 202, quorum entity 204, system 208 and rules compliance service 206 all of FIG. 2).

Thus, the rule set may contain a first group of rules that a rules compliance service can evaluate without receiving a rules evaluation message from the relevant system and/or a second group of rules that a rules compliance service can evaluate upon receiving a rules evaluation message from the relevant system. Rules of this first group may be termed "update independent rules" and rules of the second group may be termed "update dependent rules," where update refers to information in a rules evaluation message. Said a different way, rules that a rules compliance service can evaluate based on known information or information acquired outside of a rules evaluation message are update independent rules while rules that a rules compliance service can evaluate based at least in part on information acquired in a rules evaluation message are update dependent rules. Note that update independent rules in one embodiment may be update dependent rules in another embodiment, since the classification of update independent or update dependent is based on how the information is obtained by the evaluating entity (e.g., a rules compliance service or other entity that evaluates rules compliance).

In addition, since a rule set can contain logic on how rules combine to yield the determination of the validity state of RBKM (e.g., RBKM is invalid when [rule A is true and rule B is false] or rule C is true), different combinations of logic may be used to combine categories of rules (e.g., update independent rules/update dependent rules), specific rules independent of categories, and/or some combination thereof.

Figure 10:
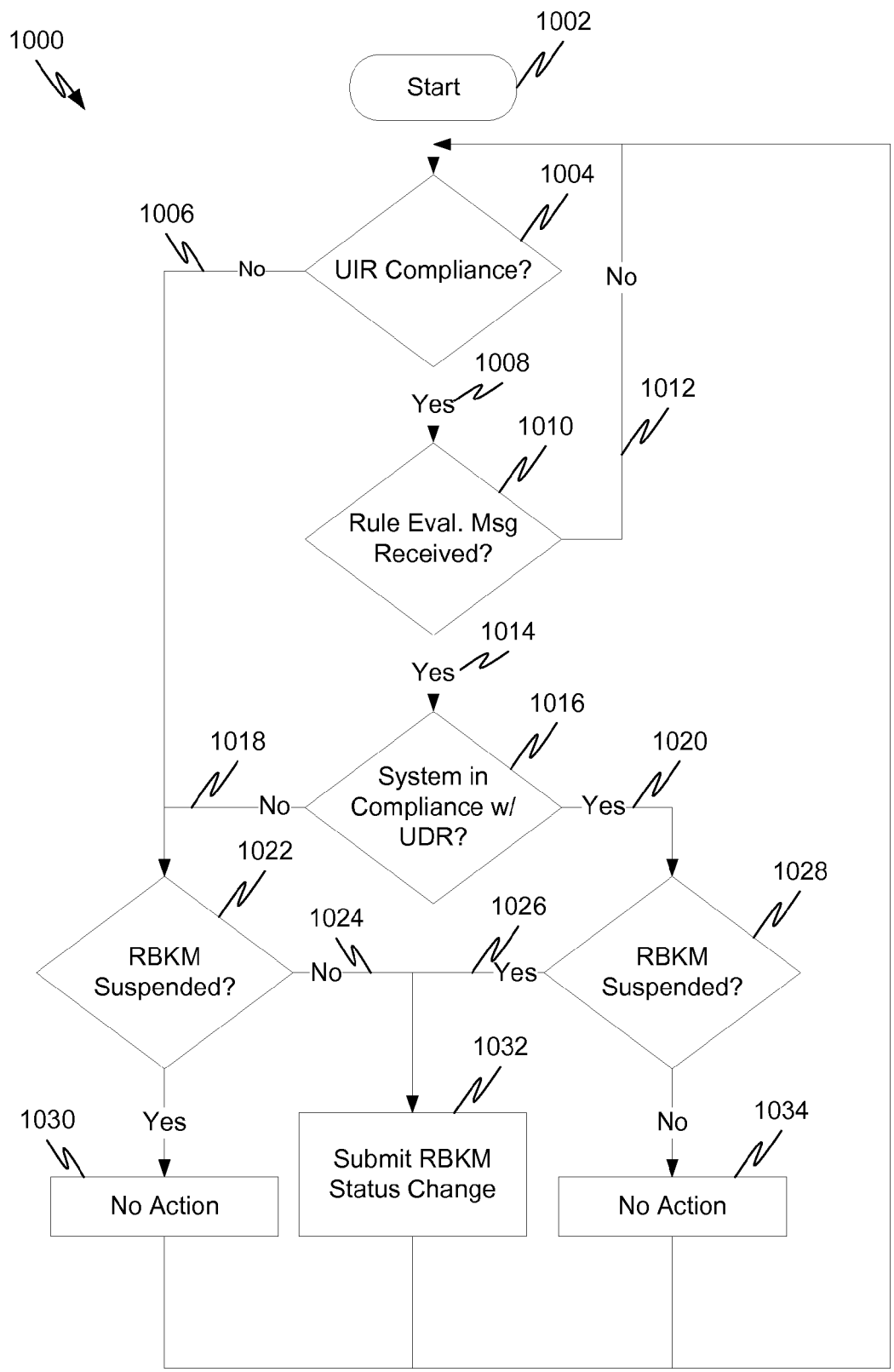
FIG. 10 illustrates a representative flow diagram for compliance with a combination of update dependent and update independent rules.

Turning now to FIG. 10 illustrates a representative flow diagram 1000 for compliance with a combination of update dependent and update independent rules. In this example, validity is based on compliance with update independent rules AND update dependent rules. If either the update independent rules OR the update dependent rules are not complied with, the validity of the RBKM is set to invalid. Other examples are also possible, as described elsewhere, but are not specifically illustrated in FIG. 10. However, based on the teachings of FIG. 10, those of skill in the art will be able to implement such alternative embodiments. In this figure the abbreviation UIR will refer to Update Independent Rule(s) and UDR will refer to Update Dependent Rule(s).

In this embodiment, examples of update independent rules include, but are not limited to, a schedule, such as time of day, day of week and so forth, a time period since the last update was received, or any other factors and/or rules that do not require receipt of an update message. Examples of update dependent rules include, but are not limited to, evaluation of a geo-fence or other location based criteria where the location is received in an update message. Quorum based rules can be either update independent or update dependent, depending on the specific details of the quorum based rule(s).

The method starts at 1002 and proceeds to operation 1004, which tests for compliance with the update independent rule(s). Since evaluation of the UIR can be determined without resort to information from the rules evaluation message, the system can independently determine compliance for these rules. When compliance with the UIR is not found, execution proceeds to operation 1022 where the validity status of the RBKM is checked. If the RBKM is already suspended (e.g., invalid), no action needs to be taken as indicated by operation 1030. If the RBKM is valid, the no branch 1024 is taken and the status of the RBKM is changed to invalid as indicated in operation 1032.

If the system remains compliant with UIR, execution proceeds to operation 1010, which determines whether a rule evaluation message is received. Thus, the combination of operations 1004 and 1010 wait until either the system is not in compliance with UIR or until a rule evaluation message is received.

When a rule evaluation message is received, execution proceeds to operation 1016. In operation 1016 compliance with the update dependent rule(s) is checked. Thus, operation 1016 checks the compliance of UDR, involving information received in the rule evaluation message from a rule evaluating system. If the system is in compliance with UDR, execution thus proceeds to operation 1028 and if the RBKM is already valid, no action is taken as indicated by operation 1034. If, however, the RBKM is suspended, execution proceeds to operation 1032 and the status of the RBKM is changed to reinstated.

When the rule evaluating system is not complying with UDR, the RBKM should be marked as suspended. Thus, the "no" branch 1018 is taken out of operation 1016 and the validity of the RBKM is checked in operation 1022. If the RBKM is already suspended, no action is taken as indicated by operation 1030. If, however, the certificate is valid, execution proceeds to operation 1032 and the status of the RBKM is changed to suspended.

Figure 11:
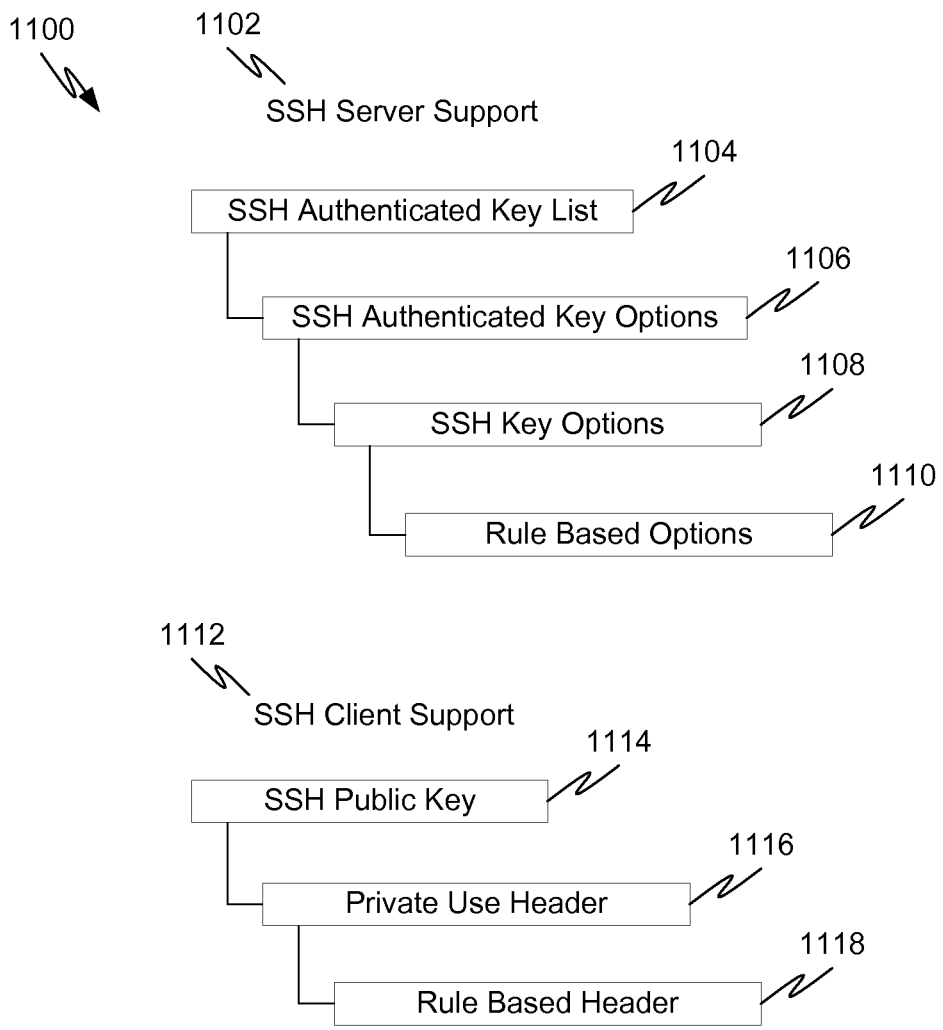
FIG. 11 illustrates a representative SSH client and server support for a rule based cryptographic key material.

FIG. 11 illustrates a representative SSH client 1112 and server 1102 support 1100 for RBKM. As previously mentioned, SSH does not use certificates as such in most implementations. However, cryptographic key material is the basis for authenticated communications and such cryptographic key material can be associated with a RBAS in order to form RBKM. In addition to cryptographic key material (e.g., various key instances), many SSH implementations have additional key options and other information that serve many of the same purposes as information in other certificate implementations such as key expiry, periodic key rotation, selecting key parameters/options to comply with various security concerns, and so forth.

In the definitions section of this description, a client is defined as the system, user, device, account, and so forth that initiates a secure connection, such as when a secure connection request is sent, while a server is the system, host, device, account, and so forth that receives a secure connection request (e.g., from a client). Systems (or other entities) can act as both a client and a server and systems can have multiple clients and/or servers on them. Thus, the information used to support a RBKM implementation can vary for clients and servers and from implementation to implementation. The illustration of FIG. 11 is meant to be a representative illustration and other embodiments can have different implementations and/or different information and/or store the same information in a different manner.

Returning for a moment to the discussion of FIG. 3, the system 314 used the RBKM information to establish an authenticated session 322 with the system 324. In this fashion, the system 314 functions as a client and the system 324 functions as a server. Looking at the described operation, the system 314 sends a rule evaluation message to rule compliance service 318 in order to allow the validity status of the RBKM material to be properly determined. The server, however, needs the cryptographic key material used to establish the authenticated session as well as a way to determine how to contact the validation/repudiation service to determine the validity status of the RBKM related information. Thus, as explained in conjunction with the embodiment of FIG. 3, the RBKM related information may include one or more of the following information:
1. one or more rule sets, including such things as timing schedules or other timing information, quorum information, geo-fence information and so forth;
2. delegate identifier(s) and/or other delegate information for things like delegation of decryption of various items, delegation of rule evaluation, service where rule evaluation messages should be sent, delegation of verification/validation of various items, and so forth;
3. policy information;
4. key instance(s) and/or identifier(s) of associated cryptographic key material (e.g., some way to indicate the related cryptographic key material); and/or
5. other information.

Most, if not all, SSH implementations support various key file headers in the SSH key file. These headers include, for example, a subject header, a comment header, and private use headers; the latter are reserved for private use. Thus, SSH client support 1112 in some embodiments are implemented by storing the RBAS or client subset thereof in the rule-based header 1118 stored as a private use header 1116 section in the key file 1114. Thus, rule-based header 1118 represents the RBAS or client subset thereof. The RBAS or client subset thereof is that rule set used by the client in authenticated communications.

The SSH server support 1102 in some embodiments stores its RBAS or server subset thereof as SSH key options. Thus, the SSH server support 1102 has an SSH key list storing client information (e.g., authenticated keys) 1104 with various key options 1106 including SSH key options 1108 for the particular client key. A section of the client key options 1108 can include the relevant RBAS stored as rule-based options 1110.

Figure 13:
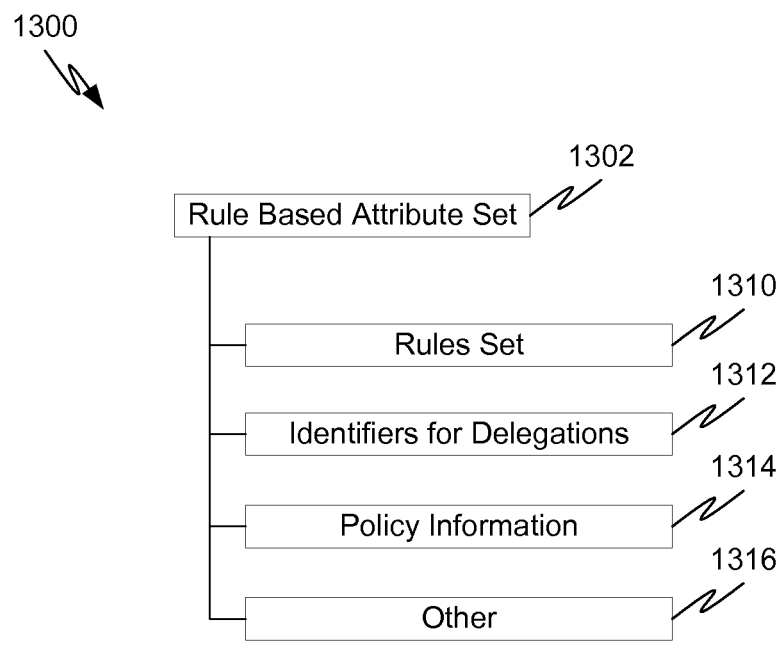
FIG. 13 illustrates a representative rules based attribute set.

A representative RBAS is illustrated in FIG. 13.

Figure 12:
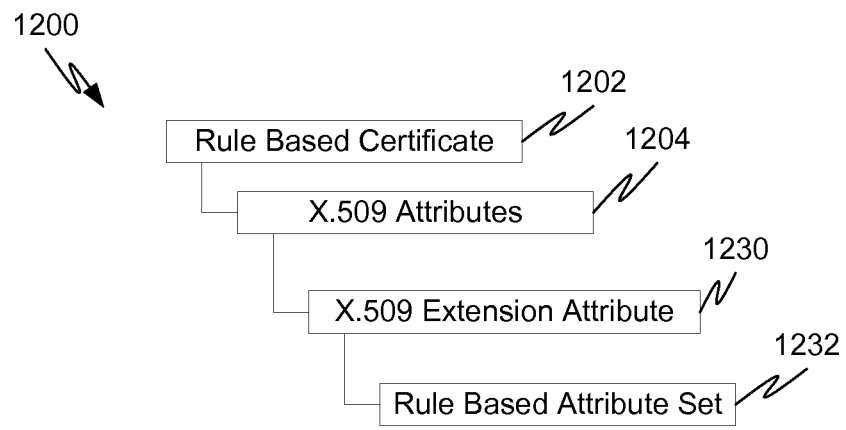
FIG. 12 illustrates a representative mechanism to embed a rules based attribute set in an X.509 certificate.

FIG. 12 illustrates a representative mechanism to embed a relevant RBAS 1232 in an X.509 certificate, shown generally as 1200. An X.509 certificate 1202 comprises numerous attributes 1204 that are defined in specifications, such as RFC 5280. One mechanism to associate RBAS 1232 with and/or embed RBAS 1232 in an X.509 certificate 1202 is to use the X.509 extension attribute 1230, which is available starting with version 3 of the X.509 certificates. As indicated in RFC 5280, the extensions defined for X.509 v3 certificates provide methods for associating additional attributes with users or public keys and for managing relationships between certification authorities. The X.509 v3 certificate format also allows communities to define private extensions to carry information unique to those communities. Each extension in a certificate is designated as either critical or non-critical. The RBAS 1232 is placed in this area of the X.509 certificate in many embodiments. A representative embodiment describing the contents of the RBAS 1232 is described in FIG. 13, below.

FIG. 13 illustrates a representative RBAS, shown generally as 1300. The RBAS 1302 can include various attributes, not all of which need be used in every embodiment. The representative RBAS 1302 of FIG. 13 can be associated with cryptographic key material to produce RBKM, such as used with an SSH embodiment (e.g., stored in the SSH public key file to which the RBAS is attached to, referenced by the authorized key list of the SSH server the RBAS is embedded in, or otherwise) or with an embodiment using RBC (e.g., an X.509 certificate plus RBAS such as that illustrated in FIG. 12). All embodiments will, at a minimum, have a rule set attribute 1310. As the RBAS is associated with cryptographic key material to form RBKM, many embodiments include some mechanism of indicating the cryptographic key material that is associated with the RBAS. Such a mechanism can be internal to the RBAS/RBKM like an identifier, associated certificate, and/or other mechanism, or external to the RBAS/RBKM such as RBAS/RBKM metadata and/or some other mechanism.

Representative attributes for a RBAS include, but are not limited to the following.

1) A rule set attribute 1310, which describes one or more rules restricting the applicability of the cryptographic key material.

2) One or more identifiers for delegates 1312 (or some way of identifying appropriate delegates). Identifiers for delegates have been described elsewhere. If there are no delegates, this attribute can be omitted.

3) A policy attribute 1314, which describes one or more policies associated with the RBKM. Policies and what they may contain have been described extensively elsewhere. This attribute can be omitted if no additional policies apply.

4) other information and/or attributes 1316.

Some embodiments also include some way of identifying associated cryptographic key material. This can be an identifier, link, and/or some other mechanism.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein are at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures may be employed. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
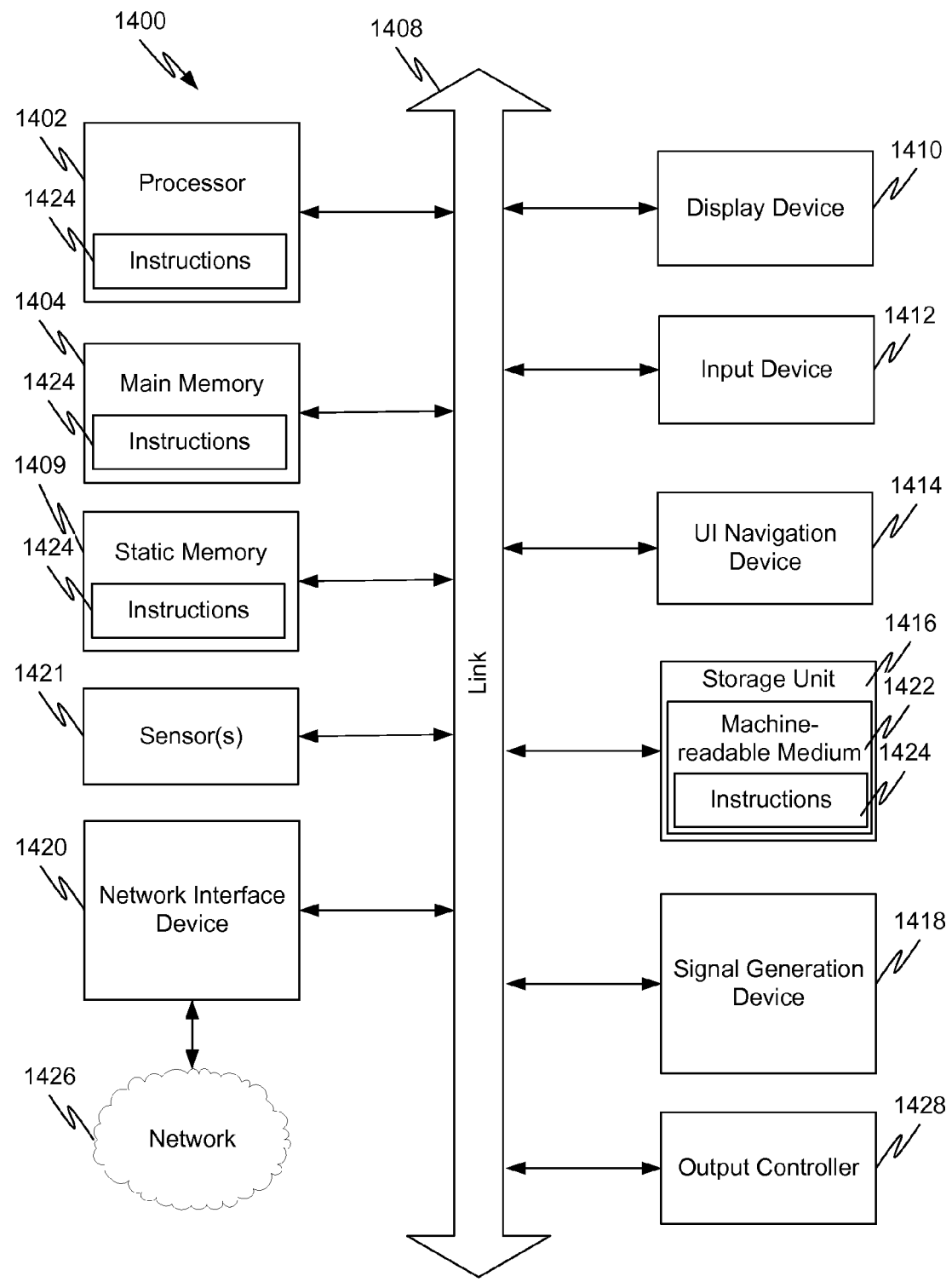
FIG. 14 is a block diagram of a machine in the example form of a processing system within which may be executed a set of instructions for causing the machine to perform any one or more of the methodologies discussed herein including the functions, systems and flow diagrams of FIGS. 1-13.

FIG. 14 is a block diagram of a machine in the example form of a processing system within which may be executed a set of instructions for causing the machine to perform any one or more of the methodologies discussed herein including the functions, systems and flow diagrams of FIGS. 1-13.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smart phone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the machine 1400 includes at least one processor 1402 (e.g., a central processing unit (CPU), a graphics processing unit (GPU), advanced processing unit (APU), or combinations thereof), a main memory 1404 and static memory 1406, which communicate with each other via bus 1408. The machine 1400 may further include graphics display unit 1410 (e.g., a plasma display, a liquid crystal display (LCD), a cathode ray tube (CRT), and so forth). The machine 1400 also includes an alphanumeric input device 1412 (e.g., a keyboard, touch screen, and so forth), a user interface (UI) navigation device 1414 (e.g., a mouse, trackball, touch device, and so forth), a storage unit 1416, a signal generation device 1428 (e.g., a speaker), sensor(s) 1421 (e.g., global positioning sensor, accelerometer(s), microphone(s), camera(s), and so forth) and a network interface device 1420.

Machine-Readable Medium

The storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404, the static memory 1409, and/or within the processor 1402 during execution thereof by the machine 1400. The main memory 1404, the static memory 1409 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The term machine-readable medium specifically excludes non-statutory signals per se.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Transmission medium encompasses mechanisms by which the instructions 1424 are transmitted, such as communication networks. Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for altering the status of cryptographic key material, the method comprising:
   receiving, by a processor via a network, a rule evaluation message from a system having presently deployed cryptographic key material used for authenticated communication, the rule evaluation message including information to allow the recipient to determine compliance with at least one rule included in a rule based attribute set associated with the presently deployed cryptographic key material;
   accessing the rule based attribute set associated with the presently deployed cryptographic key material;
   evaluating compliance of the system with the at least one rule;
   responsive to the evaluation of the at least one rule, setting a status of the cryptographic key material to either a suspended state when the system is not in compliance with the at least one rule where the cryptographic key material will not be honored to validate the system in an authenticated session or a reinstated state when the system is in compliance with the at least one rule where the cryptographic key material will be honored to validate the system in an authenticates session.

2. The method of claim 1, wherein the at least one rule comprises one of a schedule or a time period and conditions related to the schedule or the time period wherein the method of claim 1 further comprises setting the status of the cryptographic key material to the suspended state if the system does not comply with the conditions related to the schedule or the time period.

3. The method of claim 2 wherein the policy comprises a time period and wherein the status of the cryptographic key material is set to suspended if the rule evaluation message was not received during the time period.

4. The method of claim 1 further comprising determining whether the rule evaluation message is valid.

5. The method of claim 1 further comprising decrypting information included in the rule evaluation message.

6. The method of claim 5 wherein the decrypted information comprises information measured by the system and included in the rule evaluation message.

7. The method of claim 1, wherein the cryptographic key material and the rule based attribute set are included in a certificate.

8. A system comprising:
   a processor;
   memory coupled to the processor;
   instructions stored in the memory that, when executed by the processor, cause the system to:
     receive, by a processor via a network, a rule evaluation message from a device having presently deployed cryptographic key material used for authenticated communication;
     access a rule based attribute set associated with the cryptographic key material comprising:
       a first rule set including a first rule;
       a second rule set a second rule;
       conditions under which the device is in compliance with the first rule; and
       conditions under which the device is in compliance with the second rule;
     evaluate compliance of the device with at least the first rule or the second rule; and
     responsive to the evaluation, causing the status of the cryptographic key material to be set to either a suspended state or a reinstated state.

9. The system of claim 8, wherein the state is set to suspended if the device is not in compliance with either the first rule or the second rule.

10. The system of claim 8 wherein the state is suspended if the device is not in compliance with both the first rule and the second rule.

11. The system of claim 8 wherein the first rule set is an update dependent rule set and where evaluation of compliance with the first rule set is performed based on information contained in the rule evaluation message.

12. The system of claim 8 wherein the second rule set is an update independent rule set and where evaluation of compliance with the second rule set is performed independent of information contained in the rule evaluation message.

13. A machine-readable medium having executable instructions encoded thereon, which, when executed by at least one processor of a machine, cause the machine to perform operations comprising:
   access a rule based attribute set associated with presently deployed rule based key material comprising the attribute set and related cryptographic key information, the rule based attribute set comprising a first rule set comprising at least one of a timing schedule, quorum information and geo-fence information, the first rule set defining conditions under which the cryptographic key information will be honored for authenticated communication by a first system with a second system;
   evaluate compliance of the first system with the first rule set; and
   responsive to the evaluation, cause the status of the cryptographic key material to be set to either a suspended state or a reinstated state such that the first system can initiate authenticated communications when the first system is in compliance with the first rule set and the first system cannot initiate authenticated communications when the first system is not in compliance with the first rule set.

14. The machine-readable medium of claim 13 wherein the first rules set is update independent.

15. The machine-readable medium of claim 13 wherein executable instructions further cause the machine to perform operations comprising:
   receive a rule evaluation message and wherein the first rules set is update dependent and wherein evaluating compliance of the first system with the first rules set comprises evaluating the first rules set in light of information received in the rule evaluation message.

16. The machine-readable medium of claim 14 wherein:
   the rule based attribute set further comprises a second rules set, the first rules set including update independent rules and the second rules set including update dependent rules;

the rule based attribute set further comprises logic to identify how evaluation of the first rules set and evaluation of the second rules set should be combined to indicate compliance;

the executable instructions further cause the machine to perform operations comprising:

receive a rule evaluation message;

evaluate compliance of the first system to the second rules set based on information received in the rule evaluation message; and causing the status of the cryptographic key material to be set to either a suspended state or a reinstated state is based on the compliance evaluation of the first system to the first rules set and the second rules set and based on the logic to identify how evaluation of the first rules set and evaluation of the second rules set should be combined to indicate compliance.

17. The machine-readable medium of claim 13 wherein the first rules set comprises at least one of:

times at which the cryptographic key material should be valid and/or invalid;

quorum information; and geo-fence information.

18. The machine-readable medium of claim 17 wherein the state is set to suspended if the first system is outside the geo-fence.

19. The machine-readable medium of claim 13 wherein the executable instructions to cause the state of the cryptographic key material to be suspended cause machine to perform at least further operations comprising:

remove an identifier associated with the cryptographic key material on the second system.

20. The machine-readable medium of claim 13 wherein the executable instructions to cause the state of the cryptographic key material to be reinstated cause machine to perform at least further operations comprising:

replace an identifier associated with the cryptographic key material on the second system.

* * * * *

UNITED STATES PATENT AND TRADEMARK OFFICE
CERTIFICATE OF CORRECTION

PATENT NO. : 9,686,244 B2
APPLICATION NO. : 14/255762
DATED : June 20, 2017
INVENTOR(S) : Remo Ronca Page 1 of 2

It is certified that error appears in the above-identified patent and that said Letters Patent is hereby corrected as shown below:

On the Title Page

On page 2, in Column 1, under "Other Publications", Line 9, delete "Reponse" and insert --Response-- therefor On page 2, in Column 2, under "Other Publications", Line 12, delete "Ofice" and insert --Office-- therefor In the Specification In Column 8, Line 5-6, delete "evaluating" and insert --compliance-- therefor In Column 10, Line 49, delete "310," and insert --306,-- therefor In Column 12, Line 9, delete "202);" and insert --302);-- therefor In Column 12, Line 10, delete "$nonce_s$," and insert --$nonce_c$-- therefor In Column 12, Line 11, delete "202);" and insert --302);-- therefor In Column 12, Line 13, delete "218);" and insert --318);-- therefor In Column 12, Line 15, delete "218);" and insert --318);-- therefor In Column 12, Line 17, delete "202);" and insert --302);-- therefor In Column 13, Line 29, delete "400" and insert --4-- therefor In Column 15, Line 10, delete "404" and insert --504-- therefor Signed and Sealed this
Twenty-fifth Day of June, 2019

Andrei Iancu
*Director of the United States Patent and Trademark Office*

CERTIFICATE OF CORRECTION (continued)
U.S. Pat. No. 9,686,244 B2

In Column 20, Line 46, delete "706" and insert --708-- therefor

In Column 22, Line 42, delete "616);" and insert --716);-- therefor

In Column 22, Line 44, delete "616);" and insert --716);-- therefor

In Column 22, Line 46, delete "620);" and insert --720);-- therefor

In Column 22, Line 48, delete "620);" and insert --720);-- therefor

In Column 22, Line 50, delete "616);" and insert --716);-- therefor

In Column 22, Line 57, delete "616" and insert --716-- therefor

In Column 23, Line 5, delete "718" and insert --716-- therefor

In Column 23, Line 7, delete "710." and insert --708.-- therefor

In Column 23, Line 8, delete "710" and insert --708-- therefor

In Column 24, Line 63, delete "812" and insert --802-- therefor

In Column 25, Line 24, delete "704" and insert --804-- therefor

In Column 26, Line 54, delete "804" and insert --904-- therefor

In Column 33, Line 47, delete "1406," and insert --1409,-- therefor

In the Claims

In Column 36, Line 4, in Claim 8, after "set", insert --including--